(12) United States Patent
Kakui et al.

(10) Patent No.: US 7,181,119 B2
(45) Date of Patent: Feb. 20, 2007

(54) OPTICALLY AMPLIFYING WAVEGUIDE, OPTICAL AMPLIFIER MODULE, AND OPTICAL COMMUNICATION SYSTEM

(75) Inventors: Motoki Kakui, Kanagawa (JP); Chie Fukuda, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 193 days.

(21) Appl. No.: 10/933,477

(22) Filed: Sep. 3, 2004

(65) Prior Publication Data
US 2005/0078905 A1 Apr. 14, 2005

(30) Foreign Application Priority Data
Sep. 5, 2003 (JP) .............................. 2003-314622
Feb. 25, 2004 (JP) .............................. 2004-050344

(51) Int. Cl.
*G02B 6/10* (2006.01)
*H01S 3/00* (2006.01)

(52) U.S. Cl. .................. 385/129; 385/14; 385/123; 385/130; 385/131; 385/141; 359/33; 359/341.1

(58) Field of Classification Search ............... 385/14, 385/123, 129, 130, 131, 132, 141; 359/333, 359/341.1; 372/6
See application file for complete search history.

(56) References Cited

U.S. PATENT DOCUMENTS 5,500,764 A * 3/1996 Armitage et al. ...... 359/341.33
2003/0007763 A1 * 1/2003 Bazylenko et al. ......... 385/129
2003/0058526 A1 * 3/2003 Kakui ....................... 359/341.3
2004/0223211 A1 * 11/2004 Kakui et al. ............. 359/341.5
2005/0078905 A1 * 4/2005 Kakui et al. .................. 385/14

FOREIGN PATENT DOCUMENTS

JP 2001-313433 11/2001 ............. 385/123 X

OTHER PUBLICATIONS

Etsuko Ishikawa et al.; "Novel 1500 nm-Brand EDFA with Discrete Raman Amplifier"; *27th European Conference on Optical Communication*; c. 2001; pp. 48-49.

(Continued)

*Primary Examiner*—Brian M. Healy
(74) *Attorney, Agent, or Firm*—McDermott Will & Emery LLP

(57) ABSTRACT

An optically amplifying waveguide that can have a gain having a small wave-length dependency in a wavelength range shorter than the C-band, and the like. The optical amplifier module 1 optically amplifies a signal lightwave that has a wavelength lying in a wavelength range of 1,490 to 1,530 nm and that has entered an input connector 11 to output the optically amplified signal lightwave from an output connector 12. An optical isolator 21, a WDM coupler 31, an Er-doped optical fiber (EDF) 50, a WDM coupler 32, and an optical isolator 22 are provided in this order on a signal lightwave-transmitting path from the input connector 11 to the output connector 12. A pump source 41 connected to the WDM coupler 31 and a pump source 42 connected to the WDM coupler 32 are also provided. In the EDF 50, at least one of the stimulated-emission cross section and the absorption cross section assumes a maximum value at the shorter-wavelength side of a peak at a wavelength range of 1.53 μm.

25 Claims, 33 Drawing Sheets

OTHER PUBLICATIONS

Denis Barbier; "Performance and Potential Application of Erbium Doped Planar Waveguide Amplifiers and Lasers"; *Optical Amplifiers and their Applications Technical Digest*; c. 1997; pp. 72-92.

Motoki Kakui et al.; "Long-Wavelength-Band Optical Amplifiers Employing Silica-Based Erbium Doped Fibers Designed for Wavelength Division Multiplexing Systems and Networks; *The English Journal of the Institute of Electronics, Information and Communication Engineers of Japan*"; vol. E83-C, No. 6; c. 2000; pp. 799-815.

H. Ono et al.; "S-Band Erbium-Doped Silica Fibre Amplifier with Flattened-Gain of Over 21 dB"; *Electronics Letters*; vol. 38, No. 19; c. 2002; pp. 1084-1085.

Hitoshi Hatayama et al.; Variable Attenuation Slope Compensator (VASC) Using Silica-Based Planar Lightwave Circuit Technology for Active Gain Slope Control in EDFAs; *Optical Fiber Communication Conference Technical Digest*; c. 2000.

\* cited by examiner

OPTICALLY AMPLIFYING WAVEGUIDE, OPTICAL AMPLIFIER MODULE, AND OPTICAL COMMUNICATION SYSTEM

BACKGROUND OF THE INVENTION

1. Field of the Invention

The present invention relates to an optically amplifying waveguide, an optical amplifier module incorporating the optically amplifying waveguide, a planar-lightwave-circuit device, and an optical communication system.

2. Description of the Background Art

Optical amplification can be performed in the C-band (1,530 to 1,565 nm) and the L-band (1,570 to 1,600 nm) by using an erbium-doped optical fiber amplifier (EDFA). On the other hand, optical amplification in other wavelength bands is also required as the broad-band use of optical communication systems increases. In recent years, researchers and engineers have been developing a technique for optically amplifying a signal lightwave in the S-band (1,460 to 1,510 nm) by using a thulium-doped optical fiber amplifier (TDFA).

In the TDFA, however, the host glass is required to be a low-phonon-energy glass such as fluoride glass. This requirement renders the TDFA insufficient in reliability. (To date, there have been no occasions where fluoride glass is commercially used.) In addition, the TDFA can only achieve the gain in a range up to 1,510 nm or so. This upper limit produces a wavelength-range width of about 20 nm, in which the gain cannot be achieved, between the optical-amplification bands covered by the conventional EDFA and the TDFA. In other words, the low-loss wavelength range of the optical fiber cannot be sufficiently utilized. Furthermore, the TDFA has an extremely complicated dynamic behavior, so that it requires a control system different from that for the EDFA.

On the other hand, another method has been proposed in which the optical amplification is performed in a wavelength range of 1,490 to 1,520 nm or so by increasing the population inversion of a silica-based Al-codoped erbium-doped optical fiber (EDF). This method is described in the published Japanese patent application Tokukai 2001-313433 and a literature entitled "Novel 1500 nm-band EDFA with discrete Raman amplifier" (E. Ishikawa et al., ECOC 2001, Postdeadline papers, pp. 48–49).

However, the EDFA incorporating a silica-based Al-codoped EDF has a strong tendency to increase the gain with increasing wavelength in a wavelength range of 1,490 to 1,520 nm or so. When this EDFA is used alone, even when an optical filter is used to equalize the gain, the relative gain variation is as high as 56%. Consequently, the gain having a small wavelength dependency cannot be achieved. As a result, a Raman amplifier must be incorporated. However, a Raman amplifier has the following drawbacks, for example. (a) It has a lower pumping efficiency than that of a rare-earth-doped optical amplifier. (b) It requires a fiber length as long as several kilometers, so that it becomes large. (c) It may deteriorate the transmission quality due to a nonlinear phenomenon and a double Rayleigh scattering in the optical fiber.

SUMMARY OF THE INVENTION

An object of the present invention is to offer an optically amplifying waveguide that can have a gain having a small wavelength dependency in a wavelength range shorter than the C-band, an optical amplifier module incorporating the optically amplifying waveguide, a planar-lightwave-circuit device, and an optical communication system.

According to the present invention, the foregoing object is attained by offering an optically amplifying waveguide containing either silica glass or phosphate glass as a major constituent and comprising a lightwave-guiding region containing the element erbium (Er) in at least one part of the region. The optically amplifying waveguide has a stimulated-emission cross section and an absorption cross section such that at least one of the two cross sections assumes a maximum value at the shorter-wavelength side of a peak at a wavelength range of 1.53 µm.

In accordance with an aspect of the present invention, the present invention offers another optically amplifying waveguide containing either silica glass or phosphate glass as a major constituent and comprising a lightwave-guiding region containing the element erbium in at least one part of the region. In this optically amplifying waveguide, the amount of variation in gain spectrum due to the population inversion is within a range of ±0.25 in a wavelength-range width of at least 25 nm included in a wavelength range of 1,470 to 1,530 nm when the amount of variation is normalized by using the average gain in the wavelength-range width.

In accordance with another aspect of the present invention, the present invention offers an optical amplifier module that comprises:

(a) an input terminal for a signal lightwave;

(b) an output terminal for a signal lightwave; and (c) an optically amplifying waveguide of the present invention.

The optical amplifier module optically amplifies a signal lightwave that has a wavelength lying in a wavelength range of 1,490 to 1,530 nm and that has entered the input terminal to output the optically amplified signal lightwave from the output terminal.

In accordance with yet another aspect of the present invention, the present invention offers a planar-lightwave-circuit device that comprises a substrate and an optically amplifying waveguide of the present invention placed on the substrate. In addition, the present invention offers an optical amplifier module that comprises a plurality of planar-lightwave-circuit devices of the present invention and that has a structure into which at least two of the planar-lightwave-circuit devices are incorporated without the intervention of optical fiber.

In accordance with yet another aspect of the present invention, the present invention offers a laser module that comprises an optically amplifying waveguide of the present invention. In this laser module, an oscillation wavelength of at most 1,480 nm can be predetermined. In addition, the present invention offers an optical communication system that comprises a signal light-wave-transmitting path and an optical amplifier module of the present invention placed on the signal lightwave-transmitting path.

The present invention is explained below in detail by referring to the drawing. The drawing is intended to explain the invention, not to restrict the scope of the appended claims.

DETAILED DESCRIPTION OF THE INVENTION

Figure 1:
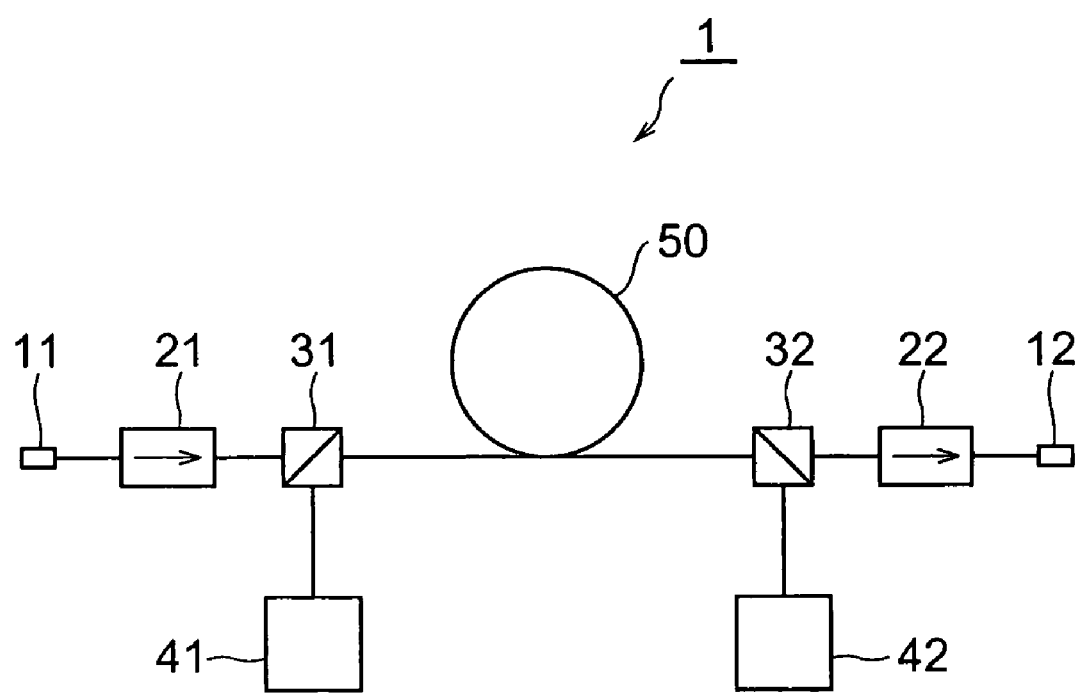
FIG. 1 is a schematic diagram showing an embodiment of the optical amplifier module of the present invention.

Embodiments of the present invention are explained below by referring to the drawing. In the drawing, the same reference signs refer to similar elements to avoid duplicated explanations. The ratio of the dimensions in the drawing does not necessarily coincide with the actual ratio.

FIG. 1 is a schematic diagram showing an embodiment of the optical amplifier module of the present invention. In an optical amplifier module 1, a signal lightwave with a wavelength lying in a wavelength range of 1,490 to 1,530 nm enters at an input terminal 11 to be optically amplified. The amplified signal lightwave is outputted from an output terminal 12. The module 1 comprises the following components in the following order on the signal light-wave-traveling path from the input terminal 11 to the output terminal 12: an optical isolator 21, a WDM coupler 31, an optically amplifying waveguide 50, a WDM coupler 32, and an optical isolator 22. The module 1 also comprises a pump source 41 connected to the WDM coupler 31 and a pump source 42 connected to the WDM coupler 32. In the module 1, the input terminal 11 is an input connector, the output terminal 12 is an output connector, and the optically amplifying waveguide 50 is an EDF.

The optical isolator 21 transmits a lightwave in the forward direction from the input connector 11 to the WDM coupler 31, but it does not transmit a lightwave in the reverse direction. The WDM coupler 31 both outputs a signal lightwave having arrived from the optical isolator 21 to the EDF 50 and outputs a pumping lightwave having arrived from the pump source 41 to the EDF 50. The WDM coupler 32 both outputs a signal lightwave having arrived from the EDF 50 to the optical isolator 22 and outputs a pumping lightwave having arrived from the pump source 42 to the EDF 50. The optical isolator 22 transmits a lightwave in the forward direction from the WDM coupler 32 to the output connector 12, but it does not transmit a lightwave in the reverse direction. The pump sources 41 and 42 output a pumping lightwave having a wavelength capable of exciting Er ions doped in the EDF 50. It is desirable that the pumping lightwave have a wavelength lying in a wavelength range of 979 to 981 nm.

The EDF 50 is an optical fiber containing silica glass as a major constituent and comprising a lightwave-guiding region doped with the element Er. In the optical amplifier module 1, the pumping lightwave outputted from the pump source 41 is supplied to the EDF 50 through the WDM coupler 31 in the forward direction. The pumping lightwave outputted from the pump source 42 is supplied to the EDF 50 through the WDM coupler 32 in the reverse direction. When a signal lightwave having a wavelength lying in a wavelength range of 1,490 to 1,530 nm enters the input connector 11, the signal lightwave passes through the optical isolator 21 and the WDM coupler 31 to enter the EDF 50, where it is optically amplified. The optically amplified signal lightwave passes through the WDM coupler 32 and the optical isolator 22 to be outputted from the output connector 12 to the outside.

In the EDF 50, at least one of the stimulated-emission cross section and the pumping lightwave-absorbing efficiency per unit length (absorption cross section) assumes a maximum value at the shorter-wavelength side of a peak at a wavelength range of 1.53 µm. Having such a feature, the EDF 50 can have the gain that has a small wavelength dependency in the wavelength range shorter in wavelength than the C-band, particularly in a wavelength range of 1,490 to 1,530 nm. In addition, because the EDF 50 has silica glass as the major constituent, it has high reliability and facilitates the control at the time of doping Er and other elements.

In addition, it is desirable that the EDF 50 have a lightwave-guiding region that is doped with the element phosphorus. In this case, at least one of the stimulated-emission cross section and the absorption cross section can have a peak in the vicinity of a wavelength of 1.49 µm. This ability is advantageous in achieving the gain in the wavelength range shorter in wavelength than the C-band. It is desirable that the EDF 50 have a nonsaturation gain per unit length, $g^*$, and a nonsaturation absorption per unit length, a, such that the ratio of the peak values of them, $g^*/\alpha$, is at least 0.8. In this case, the transition from the absorption to the amplification at the wavelength range shorter in wavelength than the C-band can be achieved with a low pumping-lightwave power.

It is desirable that the EDF 50 have a lightwave-guiding region that is doped with an oxide of the element that can turn into a trivalent positive ion. In this case, the clustering of Er ions can be prevented and the concentration quenching is reduced. To achieve this object, it is desirable that the light-wave-guiding region be doped with low-cost $Al_2O_3$ as the oxide. In this case, it is desirable that the average concentration of Al be at most 0.75 wt. %. In addition, it is desirable that the ratio, $C_{Al}/C_p$, of the Al concentration, $C_{Al}$, to the phosphorus concentration, $C_p$, be at most 0.17. In these cases, the concentration quenching is reduced, and the gain in the wavelength range shorter in wavelength than the C-band is increased.

Furthermore, it is also desirable that the EDF 50 have a lightwave-guiding region that is doped with $Yb_2O_3$ as the oxide. In this case, the absorption cross section at the wavelength range of the 0.98-µm-band pumping lightwave can be effectively increased.

Next, concrete examples of the EDF 50 are explained below together with a comparative example. Table I provides a summary of the features of EDFs produced as examples and a comparative example. Type A EDF to Type E EDF are examples, and Type F EDF is a comparative example. Table I shows the Al concentration, $C_{Al}$, the phosphorus concentration, $C_p$, the concentration ratio, $C_{Al}/C_p$, the peak value of the nonsaturation absorption, and the background loss for Type A EDF to Type F EDF.

TABLE I

| Type | $C_{Al}$ wt. % | $C_P$ wt. % | $C_{Al}/C_P$ | Nonsaturation absorption peak dB/m | Background loss dB/km |
|---|---|---|---|---|---|
| A | 0.30 | 2.80 | 0.11 | 9.6 | 16.7 |
| B | 0.40 | 5.40 | 0.07 | 19.2 | 30.0 |
| C | 0.28 | 11.30 | 0.02 | 16.0 | 22.9 |
| D | 0.00 | 5.31 | 0.00 | 16.8 | 70.0 |
| E | 0.00 | 4.08 | 0.00 | 10.7 | 10.0 |
| F | 1.20 | 4.40 | 0.27 | 5.0 | 8.5 |

All the types of the EDFs had an Er-doping concentration of 500 to 1,000 wt. ppm or so, which does not produce the concentration quenching and does not affect the fluorescence property and other properties. In addition, all the types of the EDFs had a mode field diameter of 4 to 5 µm and a cutoff wavelength of 1.1 to 1.3 µm.

FIGS. 3, 4, 5, 6, 7, and 8 are graphs showing spectra of the nonsaturation gain per unit length, $g^*$, and the nonsaturation absorption per unit length, $\alpha$, of EDFs of Types A, B, C, D, E, and F respectively. The nonsaturation gain and the nonsaturation absorption, which are determined by the composition of the EDF, are coefficients proportional to the stimulated-emission cross section and the absorption cross section, respectively.

Figure 9:
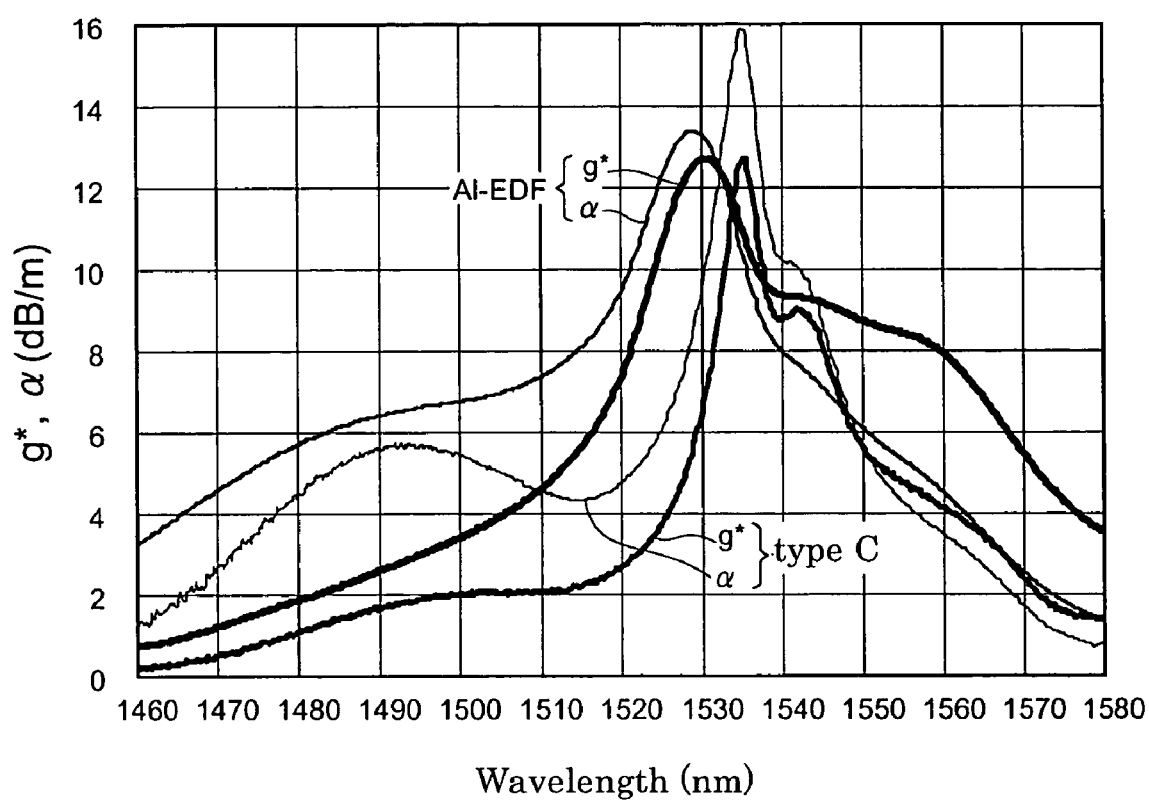
FIG. 9 is a graph showing spectra of the nonsaturation gain and the non-saturation absorption of Te C EDF and an Al-doped EDF having no doped phosphorus.

FIG. 9 is a graph showing spectra of the nonsaturation gain per unit length, $g^*$, and the nonsaturation absorption per unit length, $\alpha$, of Type C EDF and an Al-doped EDF having no doped phosphorus. Because the EDFA for the S-band use maintains the population inversion in the vicinity of 100%, the shape of the nonsaturation gain is particularly important. When compared with the nonsaturation gain of the Al-doped EDF having no doped phosphorus, the nonsaturation gain of Type C EDF has a narrower main-peak band, but it has a smaller tilt in a wavelength range of 1,490 to 1,520 nm, which is related to the EDFA for the S-band use. Type C EDF has a large suppression ratio when viewed from the peak value of the nonsaturation gain. This problem can be solved by increasing the eliminating ratio of the C-band ASE-eliminating filter. It appears that the P—Al-codoped EDF is more advantageous because the amount of loss required to the gain-equalizing filter in a signal wavelength range of 1,490 to 1,520 nm can be suppressed to a small value.

However, as can be seen from FIGS. 3 to 8, in the P—Al-codoped EDF, the spectra of the nonsaturation gain and the nonsaturation absorption depend largely on the composition. Therefore, it is important to optimize the composition.

Figure 10:
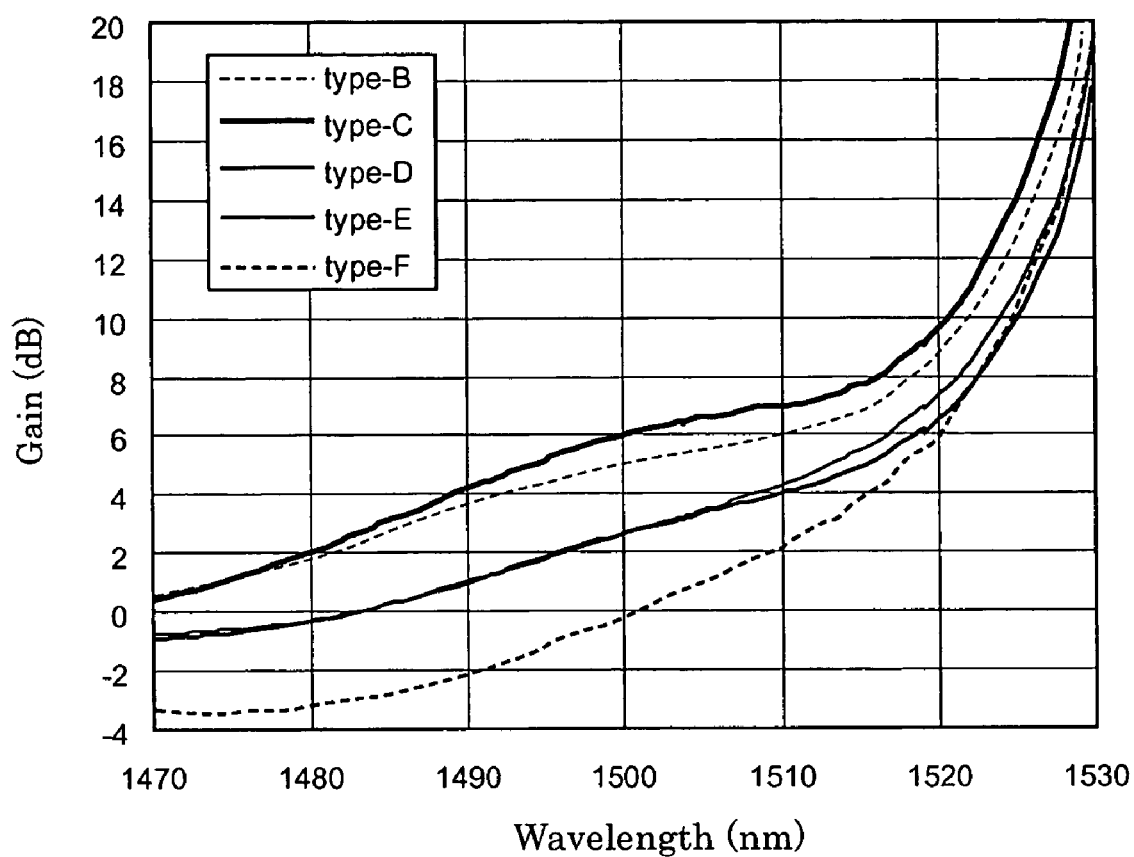
FIG. 10 is a graph showing the S-band amplification property of Type B EDF to Type F EDF when the peak value of the nonsaturation absorption is determined to be 60 dB.

FIG. 10 is a graph showing the S-band amplification property of Type B EDF to Type F EDF when the peak value of the nonsaturation absorption was determined to be 60 dB. The reason why the peak value was determined to be 60 dB is explained below. If it is smaller than 60 dB, the gain in the S-band increases. If it is larger than 60 dB, the gain tilt in the S-band becomes deteriorated. The gain was measured by using the locked-inversion method (also known as the pump-probe method), which incorporates a DFB main signal light source having five lightwaves having wavelengths of 1,491.8 nm, 1,497.8 nm, 1,503.8 nm, 1,509.9 nm, and 1,519.1 nm and a probe light source. The total signal input power to the EDF was −8 dBm, and the forward-direction pumping power was 450 mW.

As can be seen from FIG. 10, Type C EDF exhibits the highest gain. Its gain tilt in a wavelength range of 1,490 to 1,520 nm is comparable to that of Type B EDF. However, it is to be noted that Type C EDF can achieve the highest gain in the vicinity of a wavelength of 1,490 nm, which has been a bottleneck in the S-band amplifying technique by the EDFA. Type D EDF and Type E EDF have a lower gain than the value anticipated from the shape of the stimulated-emission cross section. This result is attributable to the following phenomenon. Because they have no doped Al, as can be seen from FIGS. 6 and 7, the ratio of the nonsaturation absorption to the nonsaturation gain is high. This high ratio is probably caused by the occurrence of the concentration quenching.

On the other hand, Type F EDF, which is most unlikely to produce the concentration quenching, exhibits the absorption in a wavelength range shorter than a wavelength of 1,500 nm. This result is attributable to the fact that the nonsaturation absorption, α, does not show a prominence in the vicinity of a wavelength range of 1.49 μm. More specifically, as can be seen from FIG. 8, unlike the other types of EDFs, Type F EDF does not exhibit a maximum in the vicinity of a wavelength range of 1.49 μm in both the nonsaturation gain and the nonsaturation absorption.

Figure 4:
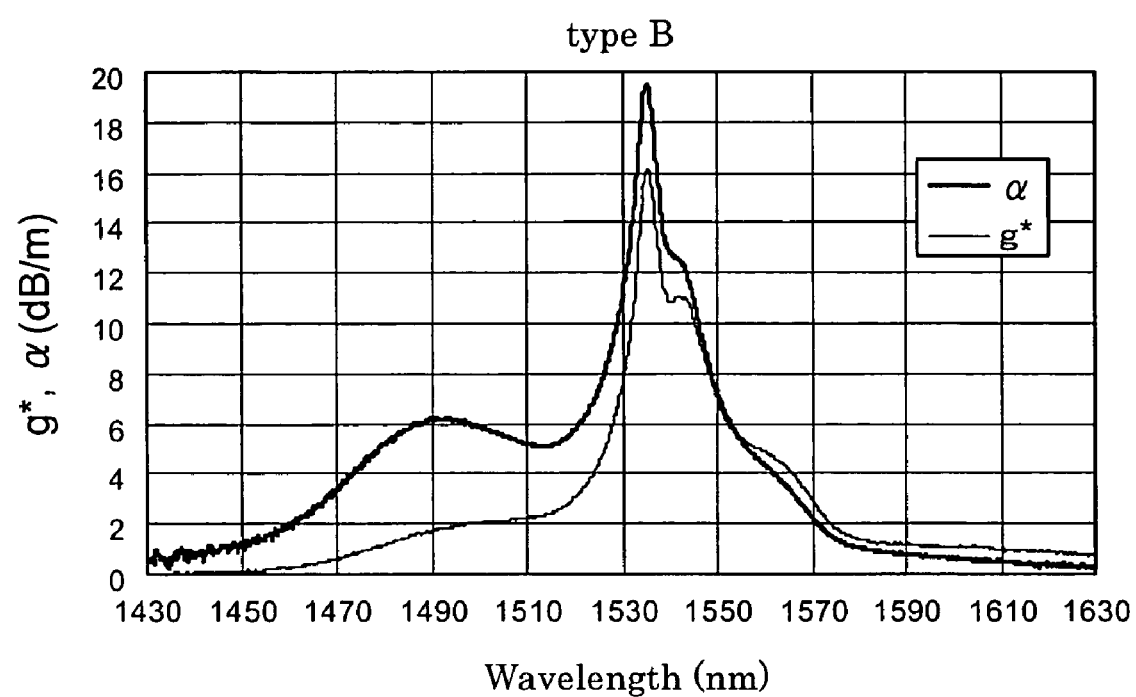
FIG. 4 is a graph showing spectra of the nonsaturation gain and the nonsaturation absorption of Type B EDF.
Figure 5:
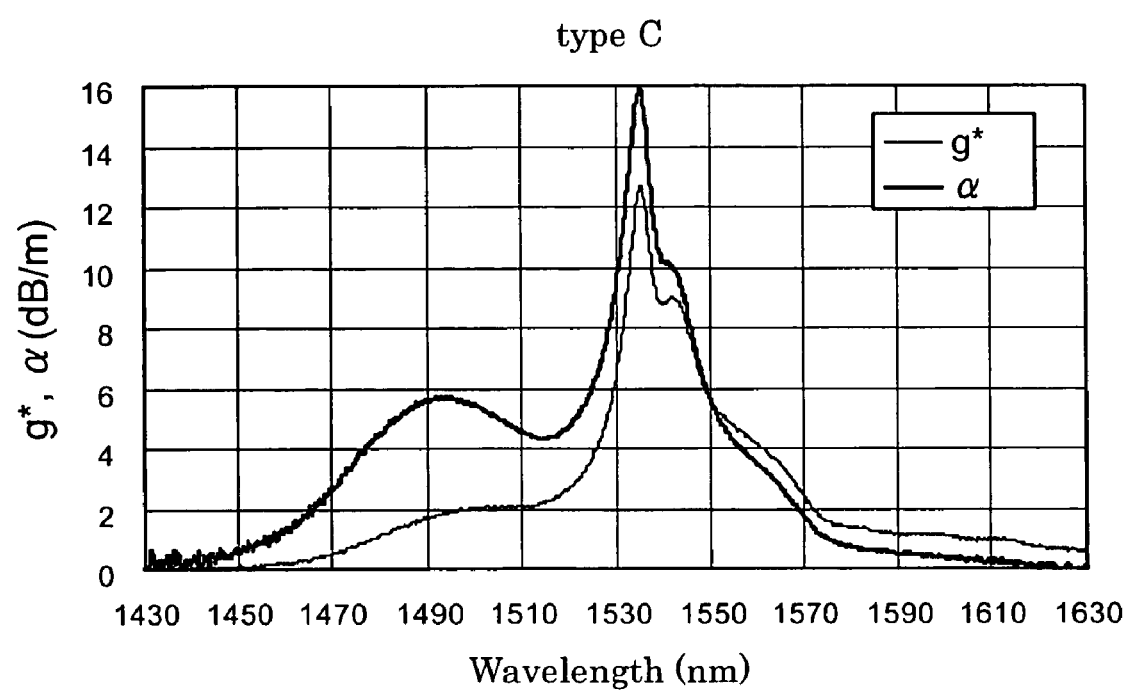
FIG. 5 is a graph showing spectra of the nonsaturation gain and the non-saturation absorption of Type C EDF.
Figure 6:
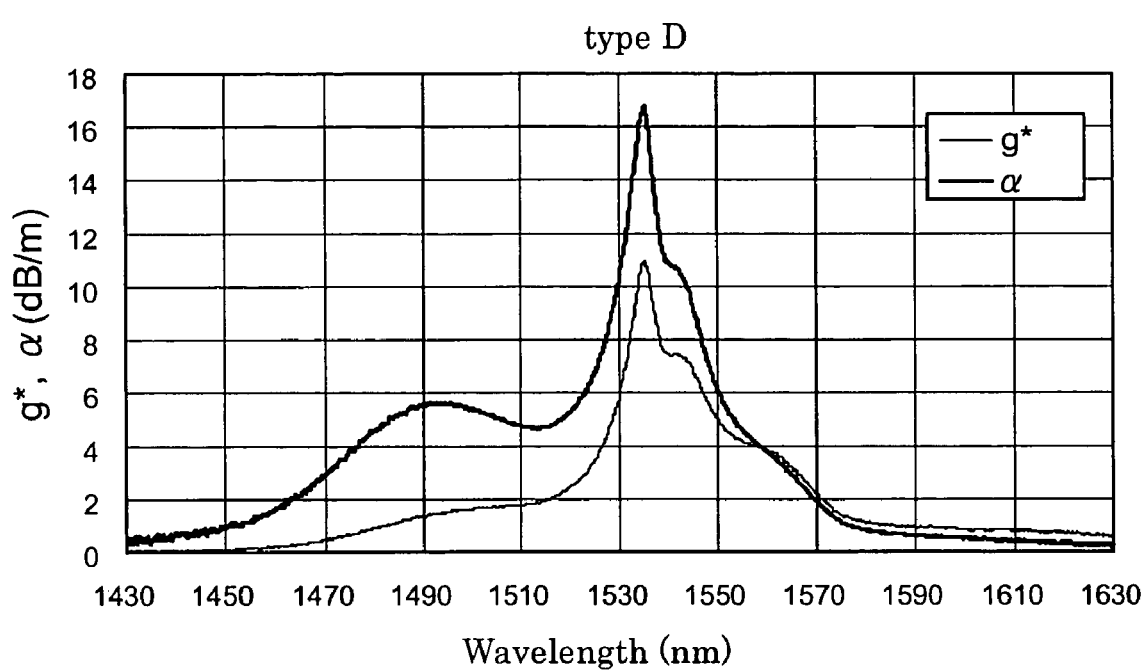
FIG. 6 is a graph showing spectra of the nonsaturation gain and the non-saturation absorption of Type D EDF.
Figure 7:
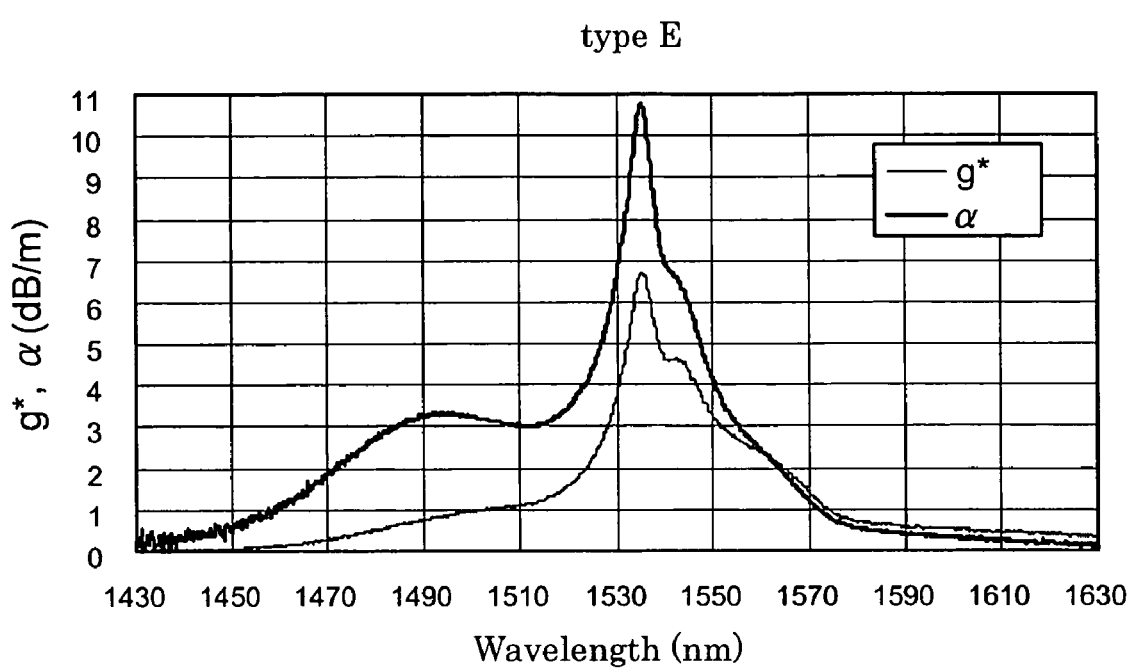
FIG. 7 is a graph showing spectra of the nonsaturation gain and the non-saturation absorption of Type E EDF.
Figure 8:
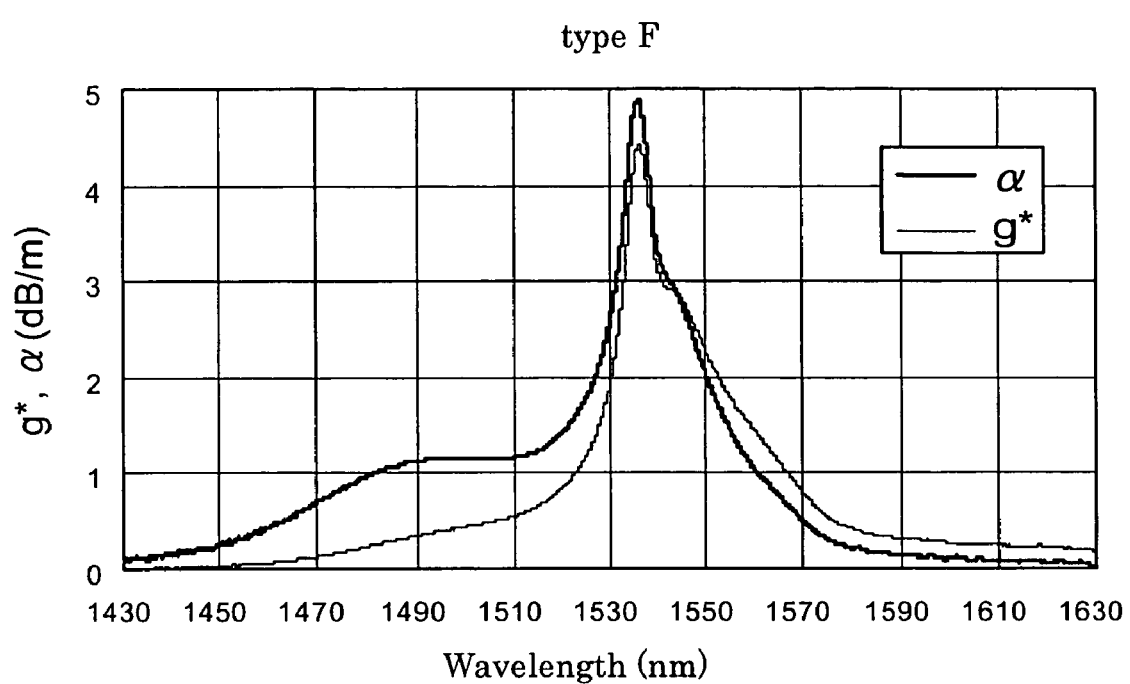
FIG. 8 is a graph showing spectra of the nonsaturation gain and the non-saturation absorption of Type F EDF.

Type B has a nonsaturation gain of about 2 dB/m in the S-band as can be seen from FIG. 4. Its background loss is 30 dB/km, which corresponds to about 1.5% of the nonsaturation gain. FIG. 10 shows that although being no match for Type C, Type B exhibits a good gain. This result probably shows that the background loss to the extent of about 1.5% of the nonsaturation gain has no effect on the gain. Of course, it is more desirable to reduce the figure to 1% as achieved in Type C.

Figure 11:
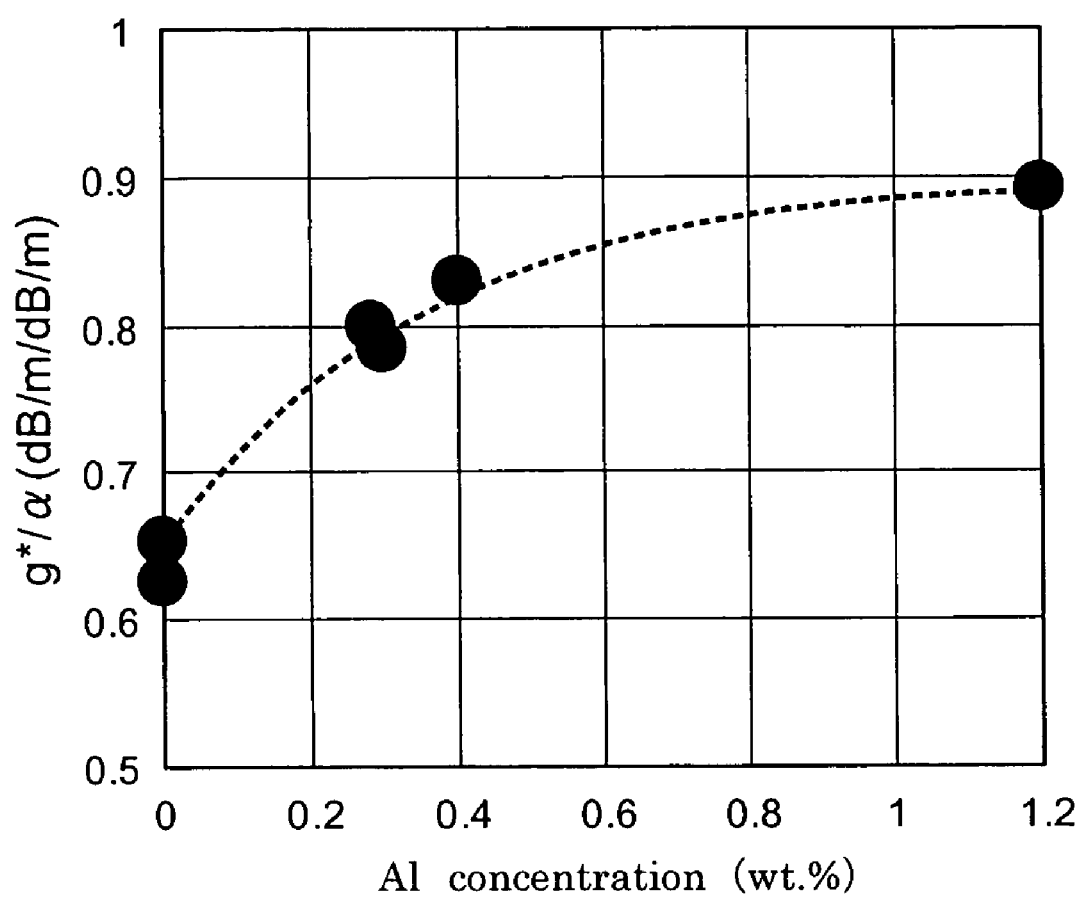
FIG. 11 is a graph showing the relationship between the ratio, $g^*/\alpha$, of the peak value of the nonsaturation gain, $g^*$, to the peak value of the nonsaturation absorption, $\alpha$, and the Al concentration.
Figure 12:
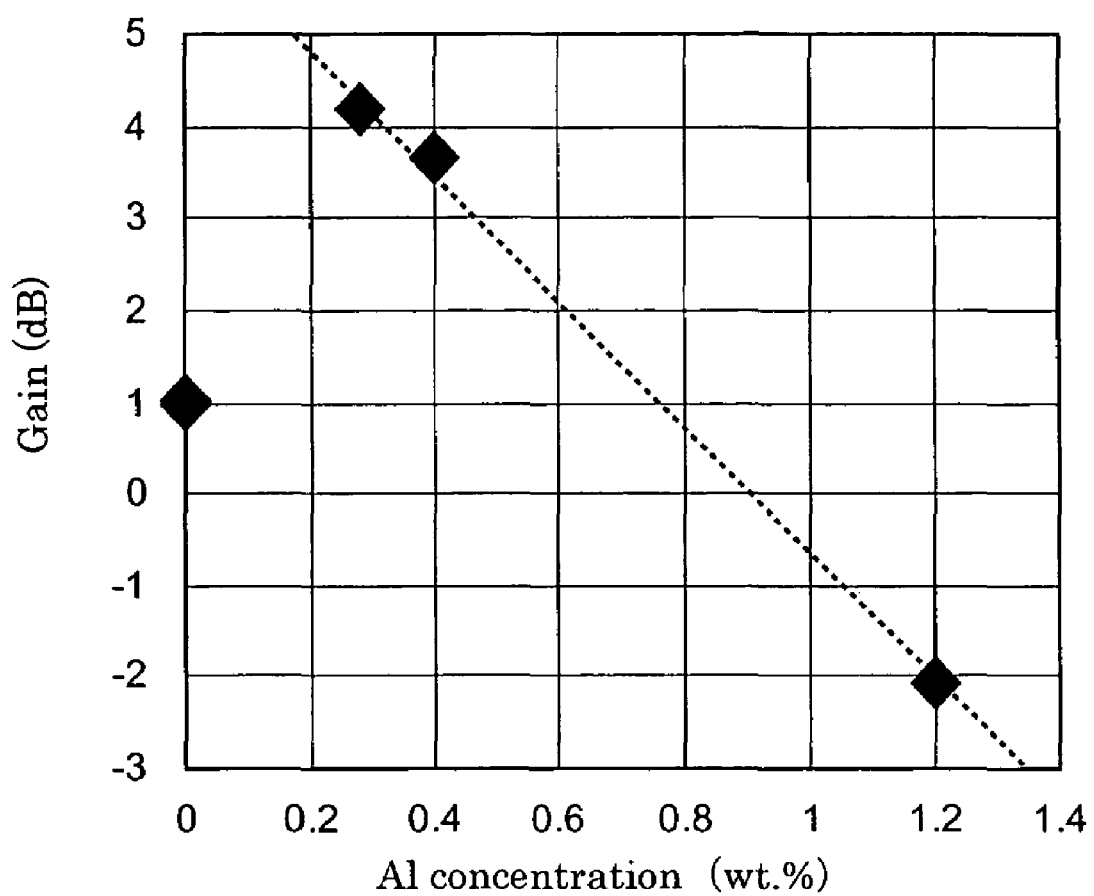
FIG. 12 is a graph showing the relationship between the Al concentration and the gain at a wavelength of 1,490 nm.
Figure 13:
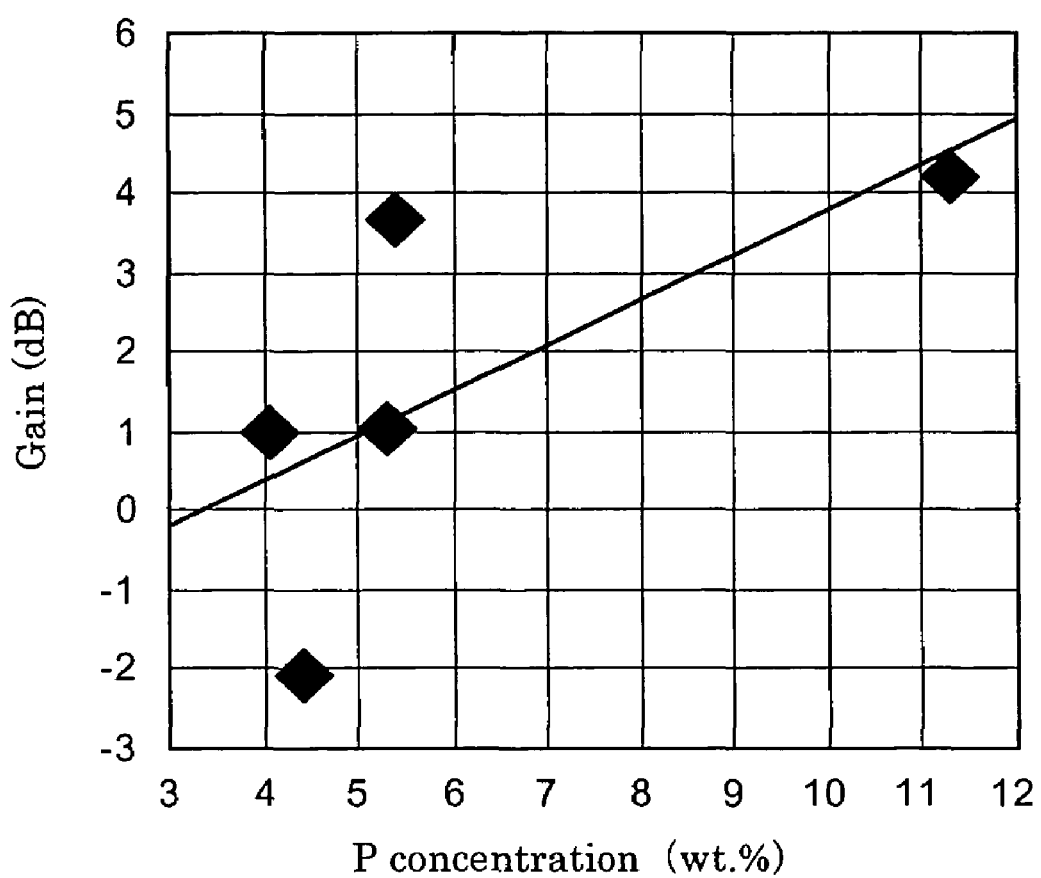
FIG. 13 is a graph showing the relationship between the phosphorus concentration and the gain at a wavelength of 1,490 nm.
Figure 14:
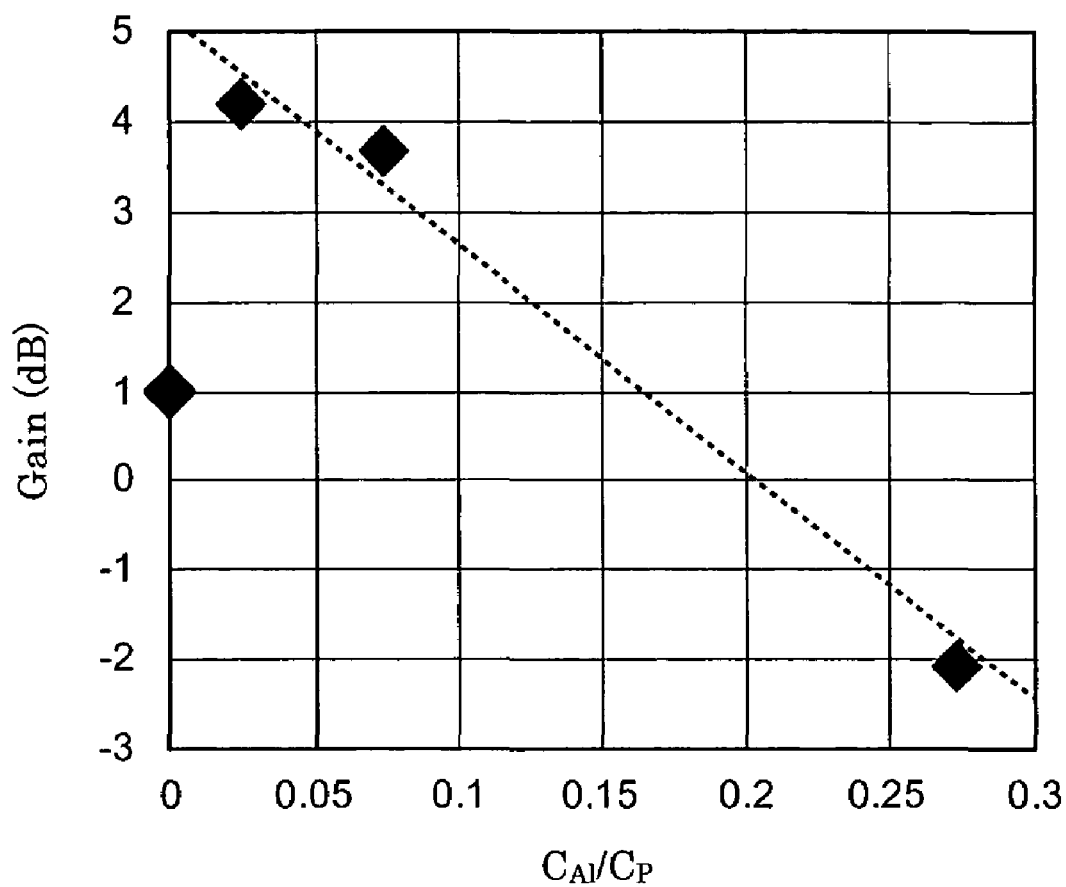
FIG. 14 is a graph showing the relationship between the ratio, $C_{Al}/C_P$, of the Al concentration, $C_{Al}$, to the phosphorus concentration, $C_P$, and the gain at a wavelength of 1,490 nm.

FIGS. 11 to 14 are graphs showing the relationship between the composition of the EDF and the S-band amplification property obtained by using the data of Types A to F. FIG. 11 is a graph showing the relationship between the ratio, g*/α, of the peak value of the nonsaturation gain, g*, to the peak value of the nonsaturation absorption, α, and the Al concentration. FIG. 12 is a graph showing the relationship between the Al concentration and the gain at a wavelength of 1,490 nm. FIG. 13 is a graph showing the relationship between the phosphorus concentration and the gain at a wavelength of 1,490 nm. FIG. 14 is a graph showing the relationship between the ratio, $C_{Al}/C_p$, of the Al concentration, $C_{Al}$, to the phosphorus concentration, $C_p$, and the gain at a wavelength of 1,490 nm.

FIG. 11 shows that as the Al concentration increases, the ratio g*/α, which is an indicator of the concentration quenching, increases. In other words, the gain spectrum becomes impervious to the nonsaturation absorption. On the other hand, however, as can be seen from FIG. 12, as the Al concentration decreases, the gain at a wavelength of 1,490 nm increases, except for Types D and E, whose Al concentration is zero. When the average Al concentration is 0.75 wt. % or less, the Al doping achieves a larger gain than that obtained when no Al is doped.

On the other hand, as can be seen from FIG. 13, it is difficult to recognize a clear correlation between the two factors to such an extent that can lead to the conclusion that as the phosphorus concentration increases, the gain at a wavelength of 1,490 nm increases. Nevertheless, FIGS. 3 to 8 show that as the phosphorus concentration increases, the peaks of the nonsaturation gain and the nonsaturation absorption at a wavelength range of 1.49 μm become noticeable. In other words, as can be seen from FIG. 14, it is reasonable to adopt the concentration ratio $C_{Al}/C_p$ as a design parameter. FIG. 14 shows that when the concentration ratio $C_{Al}/C_p$ is 0.17 or less, the Al doping achieves a better result than that obtained when no Al is doped. Of Type A EDF to Type F EDF, Type C EDF has the optimum condition in composition.

Figure 15:
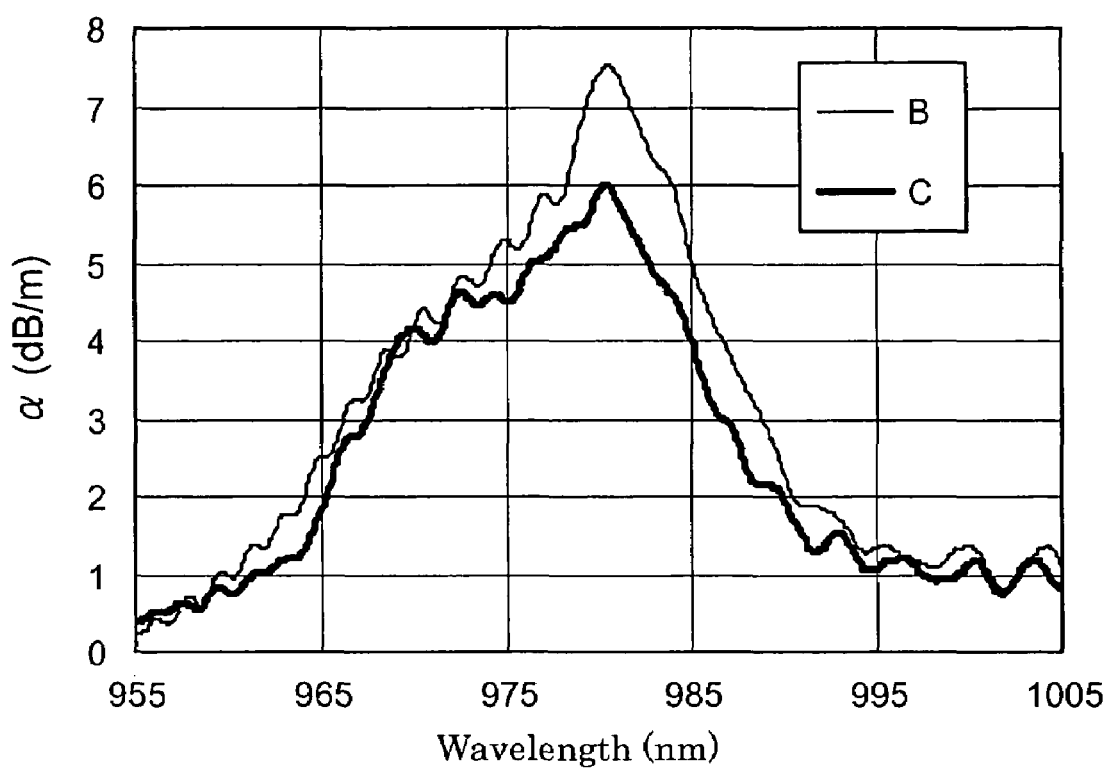
FIG. 15 is a graph showing spectra of the nonsaturation absorption of Type B EDF and Type C EDF at a wavelength range of 0.98 μm.

FIG. 15 is a graph showing spectra of the nonsaturation absorption, α, of Type B EDF and Type C EDF at a wavelength range of 0.98 μm. FIG. 15 shows that the nonsaturation absorption of Type C EDF at a wavelength range of 0.98 μm is less than 40% of the peak value of the nonsaturation absorption at a wavelength range of 1.53 μm shown in FIG. 5. In contrast, in an Al-doped EDF having no doped phosphorus, the nonsaturation absorption at a wavelength range of 0.98 μm is usually more than 60% of the peak value of the nonsaturation absorption at a wavelength range of 1.53 μm.

As described above, it is not desirable to use Type C EDF in a short length. In the case of a P—Al-codoped EDF, when a plurality of EDFs are used to constitute a multistage structure and the EDF at each stage is provided with a coupler for combining the pumping lightwave and the signal lightwave, this system renders the residual pumping lightwave in each stage useless. To avoid this disadvantage, it is desirable to employ a structure in which the residual pumping lightwave in the EDF in one stage can be utilized for the EDFs in the following stages, as shown in FIG. 16.

Figure 16:
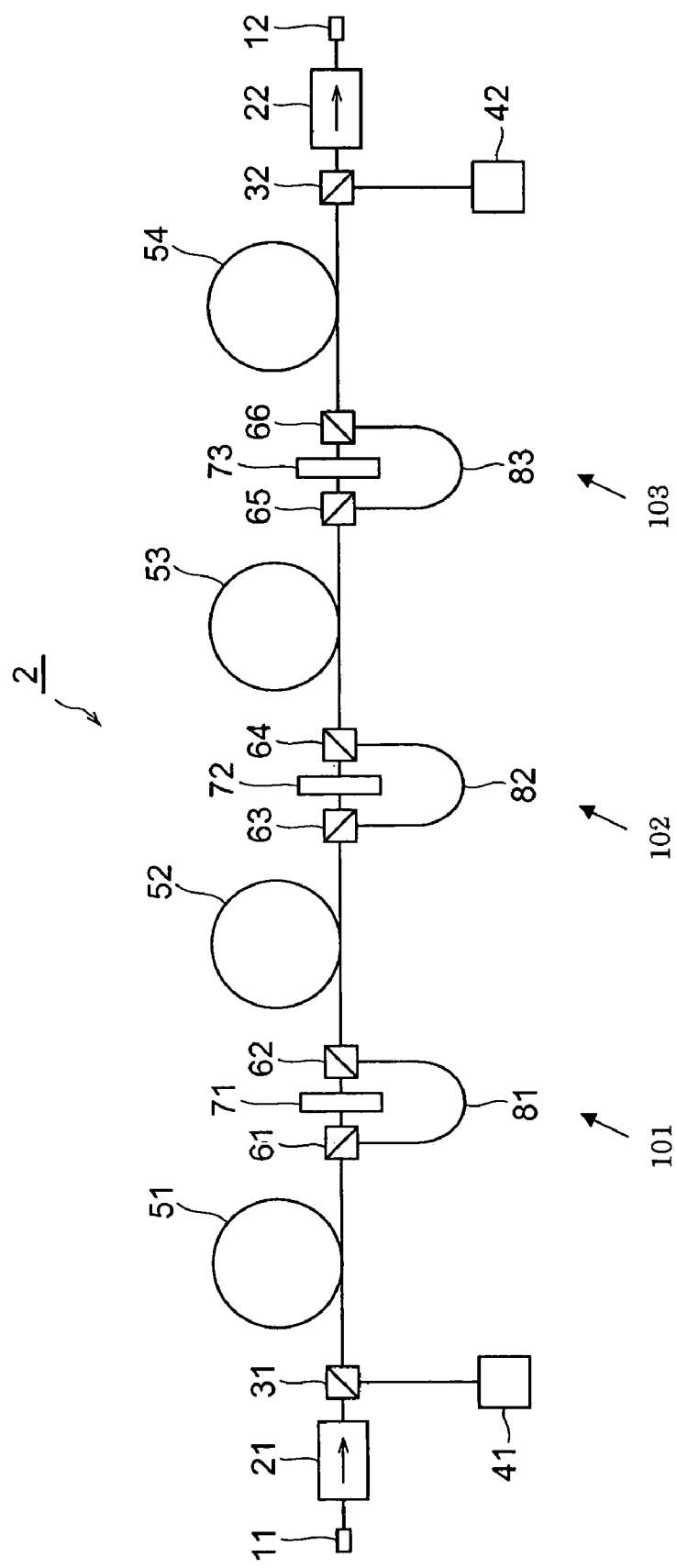
FIG. 16 is a schematic diagram showing another embodiment of the optical amplifier module of the present invention.

FIG. 16 is a schematic diagram showing an optical amplifier module 2, which is another embodiment of the optical amplifier module of the present invention. In the optical amplifier module 2, a signal lightwave with a wavelength lying in a wavelength range of 1,490 to 1,530 nm enters at an input connector 11 to be optically amplified. The amplified signal lightwave is outputted from an output connector 12. The module 2 comprises the following components placed in the following order on the signal lightwave-traveling path from the input connector 11 to the output connector 12: an optical isolator 21, a WDM coupler 31, an EDF 51, a WDM coupler 61, a C-band-eliminating filter 71, a WDM coupler 62, an EDF 52, a WDM coupler 63, a C-band-eliminating filter 72, a WDM coupler 64, an EDF 53, a WDM coupler 65, a C-band-eliminating filter 73, a WDM coupler 66, an EDF 54, a WDM coupler 32, and an optical isolator 22.

The optical amplifier module 2 also comprises a pump source 41 connected to the WDM coupler 31, a pump source 42 connected to the WDM coupler 32, a bypass optical fiber 81 connected between the WDM couplers 61 and 62, a bypass optical fiber 82 connected between the WDM couplers 63 and 64, and a bypass optical fiber 83 connected between the WDM couplers 65 and 66.

The EDFs 51 to 54 have a composition similar to that of the EDF 50 in the optical amplifier module 1. It is desirable that they be Type C EDFs.

The WDM couplers 61 and 62, the C-band-eliminating filter 71, and the bypass optical fiber 81 constitute a linking portion 101. The linking portion 101 functions as follows. The WDM coupler 61 separates a signal lightwave and a pumping lightwave having arrived from the EDF 51. It then outputs the pumping lightwave to the bypass optical fiber 81 and outputs lightwaves having the other wavelengths to the C-band-eliminating filter 71. The bypass optical fiber 81 transmits a pumping lightwave between the WDM couplers 61 and 62. The C-band-eliminating filter 71 blocks the lightwave in the C-band included in the lightwaves having arrived from the WDM coupler 61 and transmits the lightwave in the S-band. The WDM coupler 62 combines the pumping lightwave having arrived from the bypass optical fiber 81 and the lightwave in the S-band having arrived from the C-band-eliminating filter 71 to outputs them to the EDF 52. The WDM coupler 62 outputs the pumping lightwave having arrived from the EDF 52 to the bypass optical fiber 81. The WDM coupler 61 outputs the pumping lightwave having arrived from the bypass optical fiber 81 to the EDF 51.

The WDM couplers 63 and 64, the C-band-eliminating filter 72, and the bypass optical fiber 82 constitute a linking portion 102. The WDM couplers 65 and 66, the C-band-eliminating filter 73, and the bypass optical fiber 83 constitute a linking portion 103. The linking portions 102 and 103 function in a manner similar to that of the linking portion 101.

Figure 17:
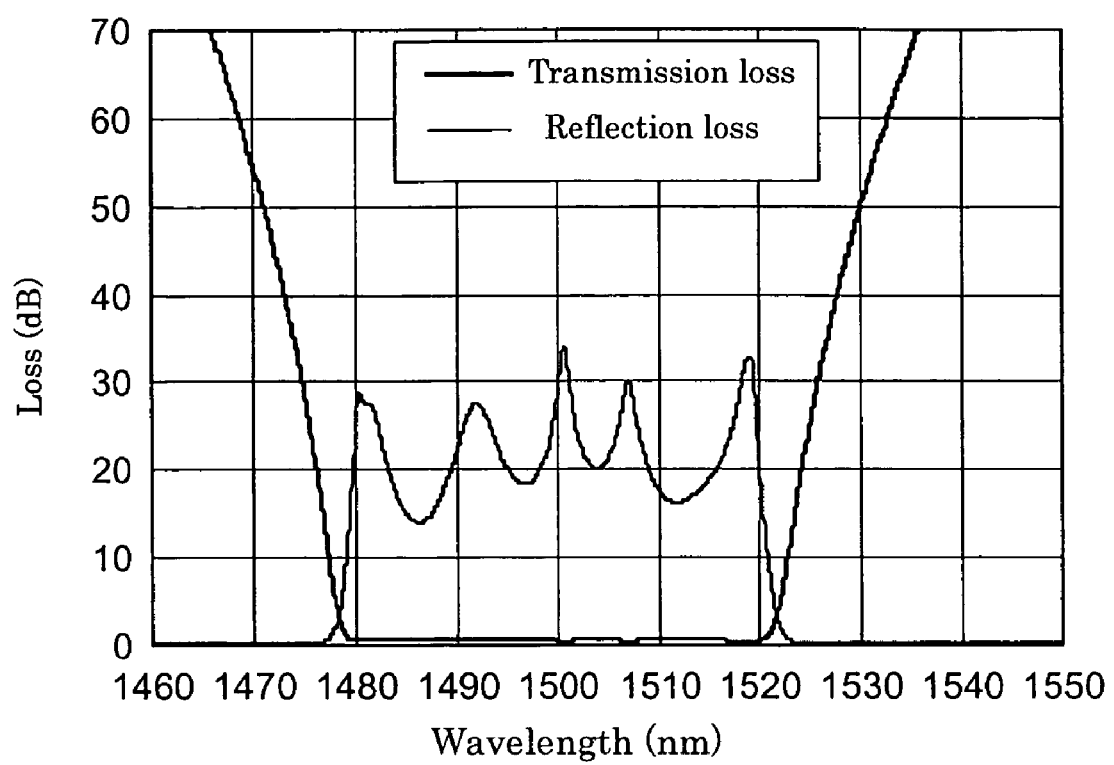
FIG. 17 is a graph showing an example of loss spectra of a C-band-eliminating filter.

FIG. 17 is a graph showing an example of loss spectra of a C-band-eliminating filter. It is desirable, to use the Fibernett-make band-pass filter having the loss spectra shown in FIG. 17 as the C-band-eliminating filters 71 to 73. This filter transmits the lightwave in the S-band with a low loss and reflects the lightwave in the C-band with a low loss. The transmitting band is 1,480 to 1,520 nm. The C-band-eliminating ratio is secured at 40 dB or so. Therefore, even a P—Al-codoped EDF, whose fluorescence in the S-band is weak against the peak value, can suppress the C-band ASE lightwave.

Figure 18A:
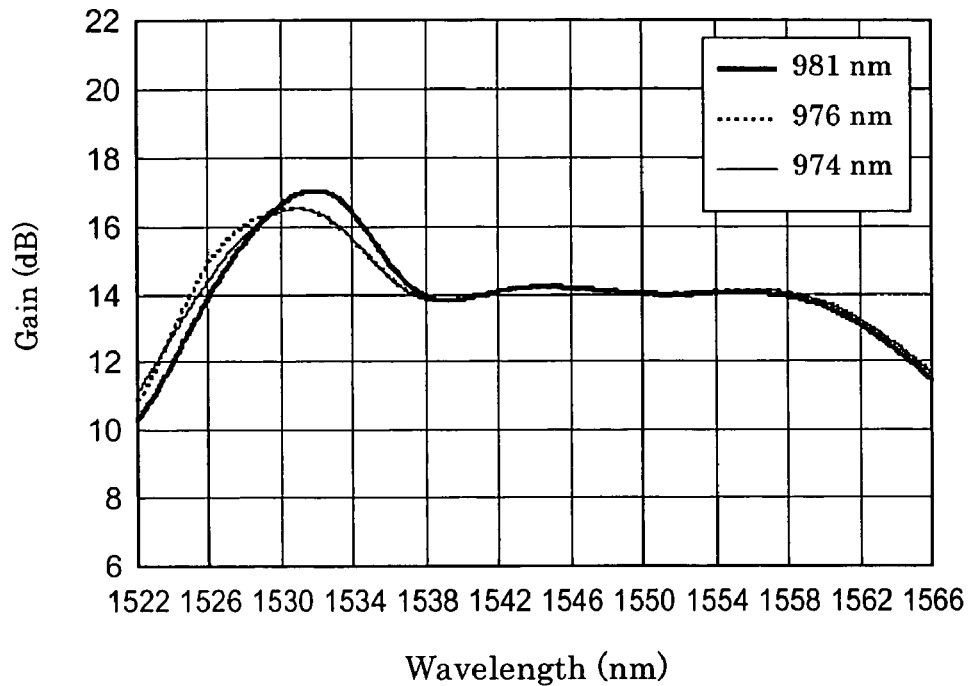
FIG. 18A is a graph showing spectra of the lightwave spontaneously emitted from an Al-doped EDF having no doped phosphorus by using the pumping wavelength as a parameter.
Figure 18B:
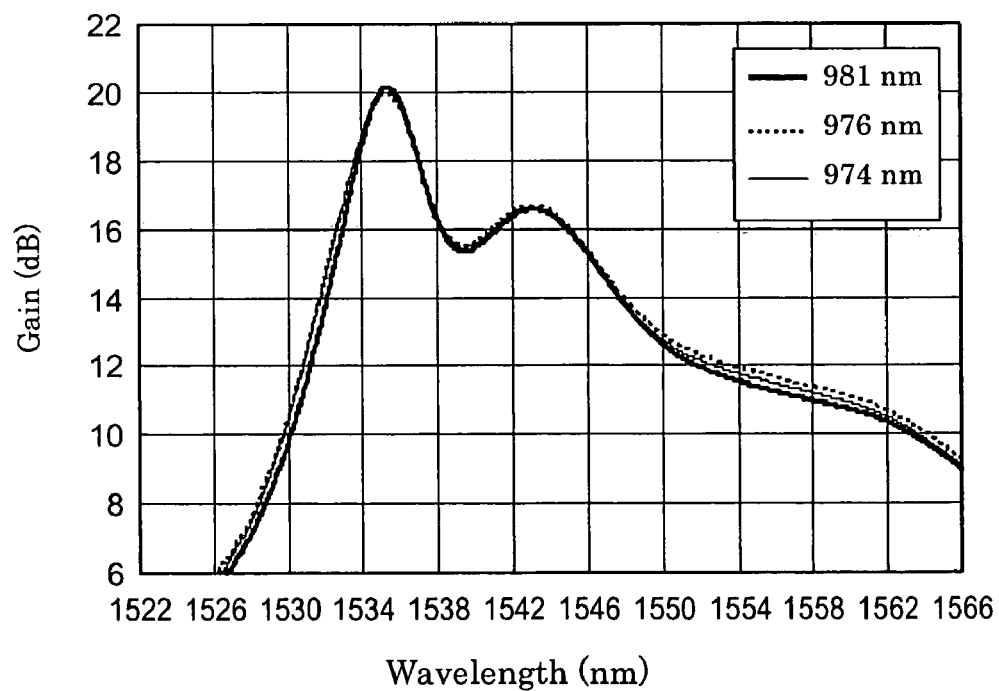
FIG. 18B is a graph showing spectra of the lightwave spontaneously emitted from a P—Al-codoped EDF by using the pumping wavelength as a parameter.

The absorption cross section for the pumping lightwave in a wavelength range of 0.98 μm is small. Consequently, it is desirable that the wavelength of the pumping lightwaves to be outputted from the pump sources 41 and 42 be predetermined in the vicinity of 981 μm, at which the best absorption coefficient is achieved. FIG. 18A is a graph showing spectra of the lightwave spontaneously emitted from an Al-doped EDF having no doped phosphorus when pumping wavelengths of 974, 976, and 981 nm are used. FIG. 18B is a graph showing spectra of the lightwave spontaneously emitted from a P—Al-codoped EDF when pumping wavelengths of 974, 976, and 981 nm are used. FIG. 18A shows that in the case of an Al-doped EDF having no doped phosphorus, the shape of the gain spectrum depends subtly on the pumping wavelength in a wavelength range of 0.98 μm. In contrast, with a P—Al-codoped EDF, as shown in FIG. 18B, even when the pumping wavelength varies, the shape of the nonsaturation gain shows nearly no variation, producing no significant difference in the spectrum of the spontaneously emitted lightwave. Therefore, the pumping wavelength for the P—Al-codoped EDFA for the S-band use may be determined only by the magnitude of the absorption coefficient.

In the optical amplifier module 2, the pumping lightwave outputted from the pump source 41 is supplied to the EDF 51 through the WDM coupler 31 in the forward direction to excite Er ions doped in the EDF 51. Of the pumping lightwave supplied to the EDF 51, the pumping lightwave's portion that has not been absorbed by the EDF 51 is supplied to the EDF 52 through the WDM coupler 61, the bypass optical fiber 81, and the WDM coupler 62 in the forward direction to excite Er ions doped in the EDF 52. In addition, of the pumping lightwave supplied to the EDF 52, the pumping lightwave's portion that has not been absorbed by the EDF 52 is supplied to the EDFs 53 and 54 in the forward direction to excite Er ions doped in the EDFs 53 and 54. Similarly, the pumping lightwave outputted from the pump source 42 is supplied to the EDFs 54, 53, 52, and 51 through the WDM coupler 32 in the reverse direction to excite Er ions doped in these EDFs.

When a signal lightwave having a wavelength lying in a wavelength range of 1,490 to 1,530 nm enters the input connector 11, the signal lightwave passes through the optical isolator 21 and the WDM coupler 31 to enter the EDF 51, where it is optically amplified. The optically amplified signal lightwave passes through the WDM coupler 61 to enter the C-band-eliminating filter 71, where the C-band ASE lightwave is eliminated. Subsequently, the signal lightwave passes through the WDM coupler 62 and enters the EDF 52 to be optically amplified.

The signal lightwave optically amplified by the EDF 52 passes through the WDM coupler 63 to enter the C-band-eliminating filter 72, where the C-band ASE lightwave is eliminated. Subsequently, the signal lightwave passes through the WDM coupler 64 and enters the EDF 53 to be optically amplified. The signal lightwave optically amplified by the EDF 53 passes through the WDM coupler 65 to enter the C-band-eliminating filter 73, where the C-band ASE lightwave is eliminated. Subsequently, the signal lightwave passes through the WDM coupler 66 and enters the EDF 54 to be optically amplified. The signal lightwave optically amplified by the EDFs 51 to 54 passes through the WDM coupler 32 and the optical isolator 22 to be outputted from the output connector 12 to the outside.

In the optical amplifier module 2, the absorption-length product of each of the EDFs 51 to 54 was predetermined to be 60 dB, so that the total absorption-length product was 240 dB (60 dB×4). Because the EDF's gain in the S-band is extremely low, it is important to reduce the insertion loss of passive optical parts. The insertion loss per linking portion (one C-band-eliminating filter and two WDM couplers) was about 0.8 dB at a wavelength range of 0.98 μm and about 1.5 dB at a wavelength range of 1.50 μm. The insertion losses of the input and output connectors were 1.0 dB and 1.1 dB, respectively.

Figure 19:
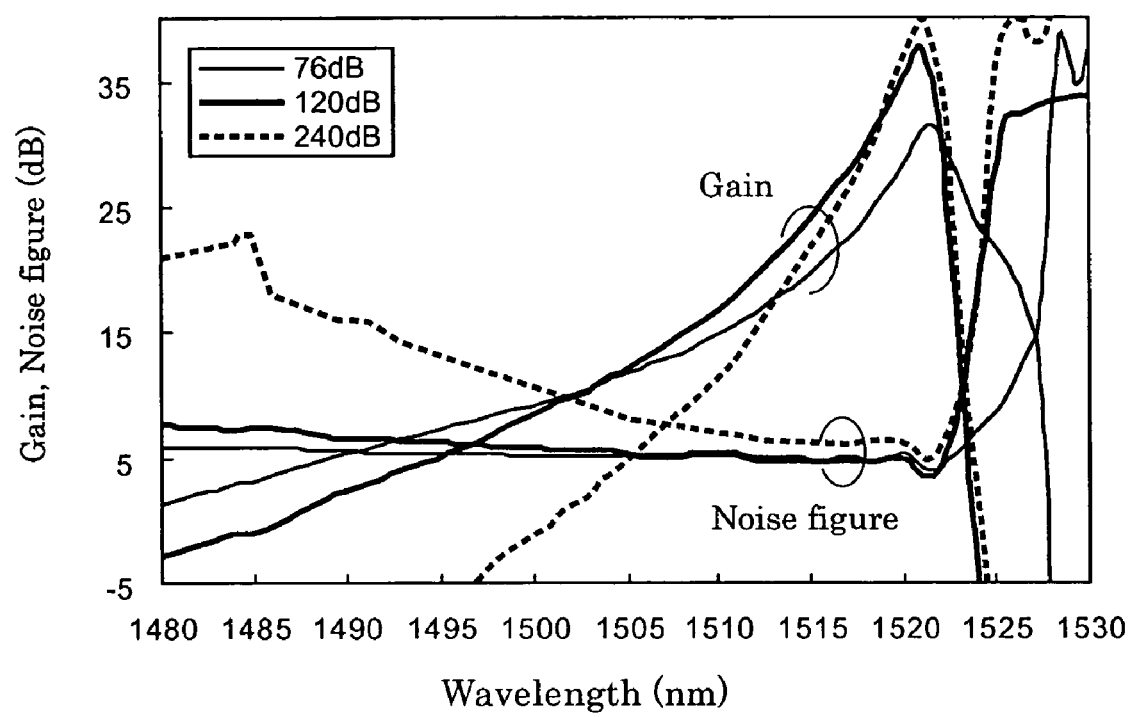
FIG. 19 is a graph showing a gain property and a noise figure property of an Al-doped EDF having no doped phosphorus by using the absorption-length product as a parameter.

To evaluate the property of the optical amplifier module 2, a comparison was conducted by using an EDFA having a similar structure incorporating a silica-based Al-doped EDF having no doped phosphorus. The absorption-length product of the Al-doped EDF having no doped phosphorus was predetermined to be 120 dB. The reason for this is explained below. The Al-doped EDF having no doped phosphorus has a large ratio of the S-band region to the peak of the stimulated-emission cross section. Therefore, if the value of 240 dB is adopted as the absorption-length product, the value is excessively large, so that the population inversion is decreased. As a result, the positive gain tilt is extremely increased. FIG. 19 is a graph showing a gain property and a noise figure property of an Al-doped EDF having no doped phosphorus by using the absorption-length product as a parameter. When the absorption-length product is decreased, although the gain tilt is reduced, the gain is decreased. In view of the trade-off between the two factors, the absorption-length product was predetermined to be 120 dB, which is a limit to prevent the deterioration of the noise figure.

Figure 20:
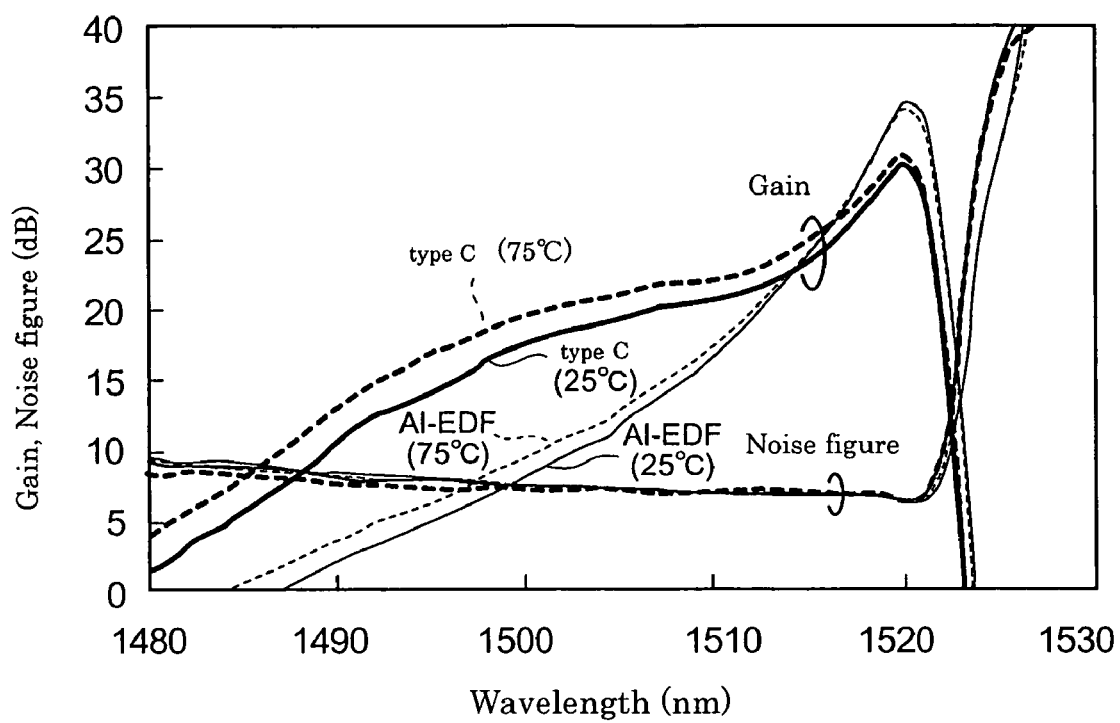
FIG. 20 is a graph showing S-band amplification properties of a P—Al-codoped EDF and an Al-doped EDF having no doped phosphorus.

FIG. 20 is a graph showing S-band amplification properties of Type C P—Al-codoped EDF (absorption-length product: 240 dB) and an Al-doped EDF having no doped phosphorus (absorption-length product: 120 dB). The total signal input power was −8 dBm, the forward-direction pumping power was 300 mW, the reverse-direction pumping power was 150 mW, and the temperatures were 25° C. and 75° C. The Al-doped EDF having no doped phosphorus showed a poor gain in a wavelength range of 1,492 to 1,502 nm. On the other hand, Type C EDF achieved a gain improvement of about 9 dB in the same wavelength range. The gain improvement was further increased to over 10 dB by heating the EDF from 25° C. to 75° C. using a heater or Peltier device.

As explained by referring to FIG. 13, it is desirable to increase the phosphorus concentration. An optically amplifying waveguide made of phosphate glass is advantageous in that (a) it can have a gain that has a small wavelength dependency in a wavelength range shorter in wavelength than the C-band, (b) it can increase the phosphorus concentration, and (c) it has a reduced tendency to produce concentration quenching. Furthermore, like silica-based glass, phosphate glass is suitable as the host glass for a planar lightwave circuit (PLC), as described in a literature reported by D. Barbier (OAA 1997, Tech. Dig., TuAl, 1997).

The optical amplifier module 2 incorporating an optical fiber as the optically amplifying waveguide has a good polarization property. In addition, an optical fiber is easy to produce in a long length, so that the absorption-length product of the optically amplifying waveguide can be easily increased. This advantage enables the flexible design and production of the optical amplifier module. On the other hand, when an optical fiber is used as the optically amplifying waveguide, it is necessary to add a component for eliminating the C-band ASE lightwave, thereby rendering the constitution complicated. In addition, this system has a drawback in that the number of fusion-splicing portions increases, so that the housing becomes difficult and the assembling work requires a long time.

In contrast, when a PLC is used as the optically amplifying waveguide, it is easy to integrate an ASE-eliminating filter, an optical waveguide for bypassing the filter to transmit the pumping lightwave, a gain equalizer, and the like. In other words, it is suitable for the optical amplifier module of the present invention to incorporate a PLC in terms of the component configuration and production.

Figure 21:
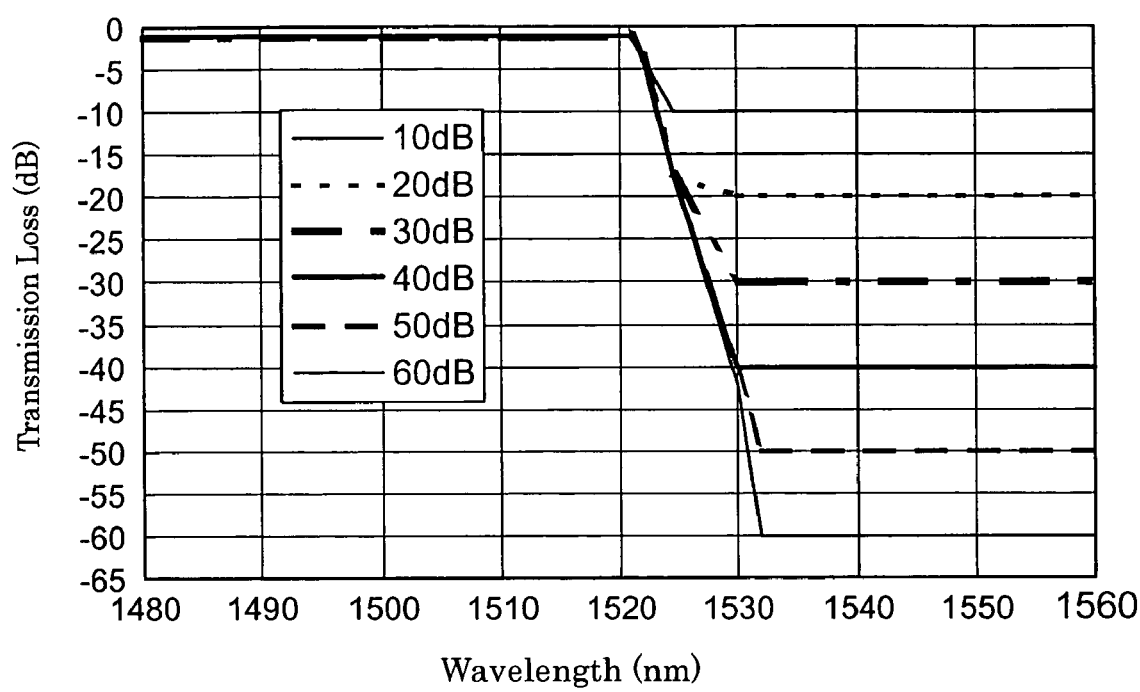
FIG. 21 is a graph showing an example of loss spectra of an ordinary C-band-eliminating filter.

An ASE-eliminating filter for eliminating the C-band ASE is explained below. FIG. 17 shows a filter that has a good property in that the extinction ratio exceeds 60 dB at 1,535 nm, which is the ASE peak wavelength. Nonetheless, commercially available filters generally include a number of filters that have a poorer extinction ratio. FIG. 21 is a graph showing an example of loss spectra of an ordinary C-band-eliminating filter.

Figure 22:
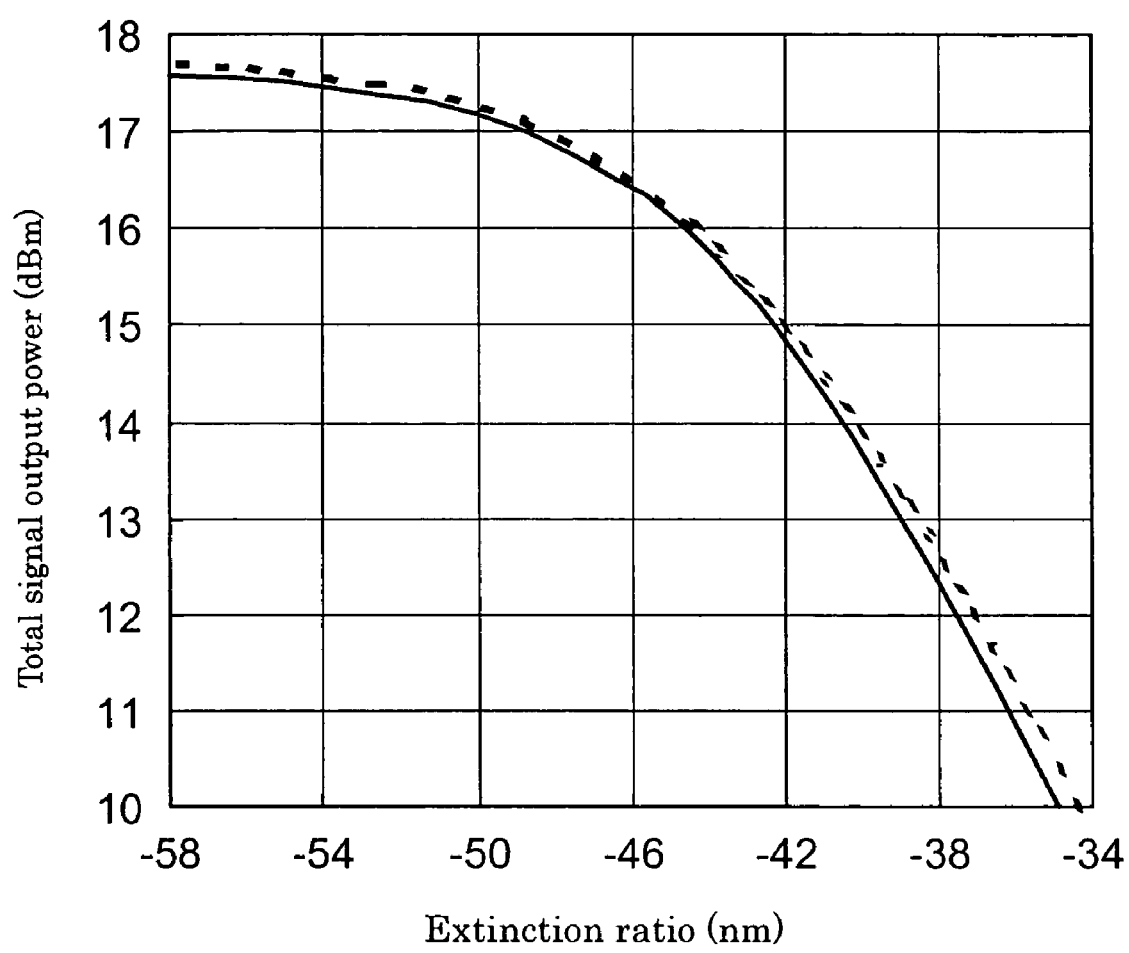
FIG. 22 is a graph showing the result of a simulation for obtaining the relationship between the extinction ratio of the filter and the total signal output power in the optical amplifier module 2.

FIG. 22 is a graph showing the result of a simulation for obtaining the relationship between the extinction ratio of the filter and the total signal output power in the optical amplifier module 2. A solid line shows the relationship at 25° C., and a dotted line, at 75° C. Although the signal output power is expected to reach 17.5 dBm in the first place, it decreases to no more than 14 dBm when the extinction ratio is 40 dB. To suppress the amount of deterioration to at most 1 dB, which is the production variation due to variations in optical parts and fusion splice loss, it is necessary to increase the extinction ratio of the ASE-eliminating filter to at least 46 dB. In the above-described embodiment, the ASE-eliminating filter is used in an operating status that transmits the signal lightwave. However, when it is used in an operating status that reflects the signal lightwave, it is difficult to increase the extinction ratio to at least 46 dB as shown in the example in FIG. 17.

Figure 23:
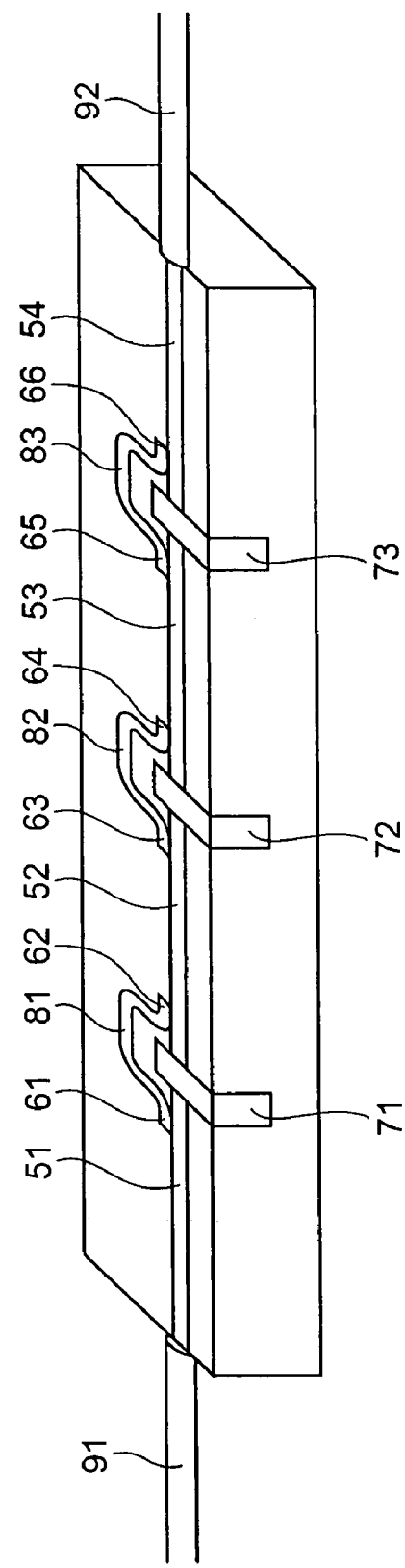
FIG. 23 is a perspective view showing an embodiment in which the optical amplifier module 2 is implemented as a planar-lightwave-circuit device

An embodiment in which a PLC is used as the optically amplifying waveguide of the present invention is explained below. FIG. 23 is a perspective view showing an embodiment in which the optical amplifier module 2 is implemented as a planar-lightwave-circuit device. As shown in FIG. 23, grooves are formed so as to intersect optically amplifying waveguides 51 to 54 that transmit a signal lightwave. Dielectric multilayer films acting as ASE-eliminating filters 71 to 73 are inserted in the individual grooves.

It is desirable that the optically amplifying waveguides 51 to 54 have an Er-doped region that has an Er concentration of 1 to 2 wt. %. It is desirable that the waveguide have a cross-sectional area of $2\times2$ $\mu m^2$ to $3\times3$ $\mu m^2$ or so. When it is intended to have a cutoff wavelength of 0.95 $\mu m$, which is shorter than the pumping wavelength, it is necessary that the relative refractive-index difference be about 2% for a cross-sectional area of $2\times2$ $\mu m^2$. In this case, the minimum bending radius for preventing the transmission loss is 10 mm. In these cases, the integration can reduce the size and loss. When a cross-sectional area of $3\times3$ $\mu m^2$ is employed, although a relative refractive-index difference of 1% is allowed, the minimum bending radius is increased to 25 mm.

It is desirable that the ASE-eliminating filter have an extinction ratio of at least 46 dB at an ASE peak wavelength in a wavelength range of 1.53 $\mu m$. In this case, the deterioration of the pumping efficiency at the time of the amplification of the S-band lightwave can be reduced. The groove for placing the ASE-eliminating filter is formed so as to be slightly slanted against the optical axis of the optically amplifying waveguide.

It is desirable that the planar-lightwave-circuit device be provided with a path through which the 0.98-$\mu m$ pumping lightwave can bypass the ASE-eliminating filter. This design also enables the integration for reducing the size and loss accompanied by the cost reduction. To connect the optically amplifying waveguide with the bypassing path, WDM couplers 61 to 66 are provided before and after the corresponding ASE-eliminating filter. The coupler is either a directional coupler or a Mach-Zehnder interferometer. The directional coupler has an extinction ratio of 5 dB, and the Mach-Zehnder interferometer, about 30 dB. The Mach-Zehnder interferometer can have a wider spectrum width in transmitting band than that of the directional coupler. Therefore, it is desirable to use the Mach-Zehnder interferometer to amplify the WDM signal.

Figure 24:
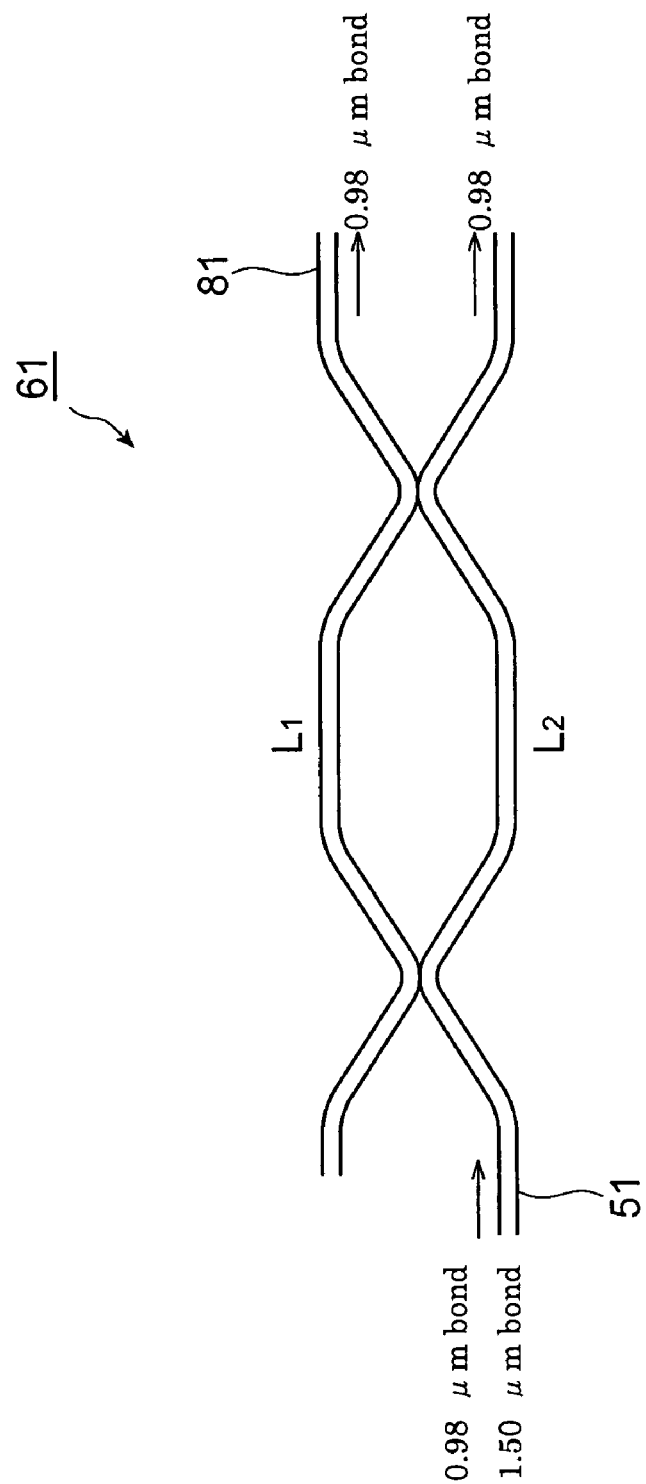
FIG. 24 is a schematic diagram showing a Mach-Zehnder interferometer as the WDM coupler.
Figure 25:
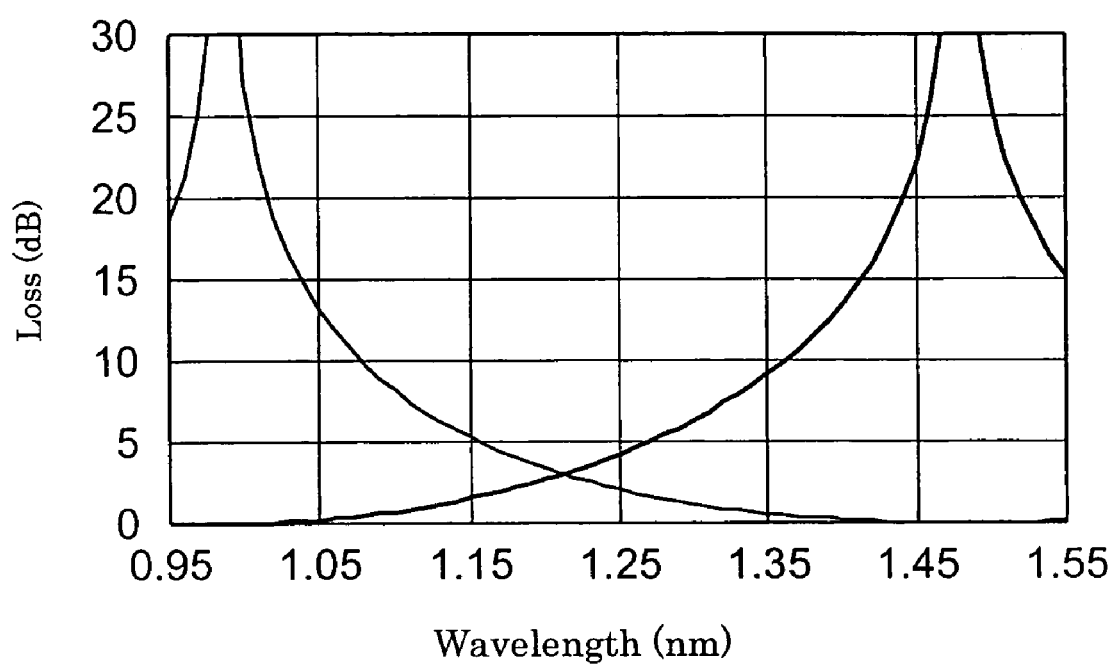
FIG. 25 is a graph showing the optically coupling property of a Mach-Zehnder interferometer.

FIG. 24 is a schematic diagram showing a Mach-Zehnder interferometer as the WDM coupler. FIG. 25 is a graph showing the optically coupling property of a Mach-Zehnder interferometer. A WDM coupler having the optically coupling property as shown in FIG. 25 can be obtained by designing a Mach-Zehnder interferometer such that (a) one of its two optical paths between the two optically coupling portions has a length, $L_1$, of 5,000.00 $\mu m$, (b) the other optical path has a length, $L_2$, of 5,001.07 $\mu m$, and (c) the waveguide has an effective refractive index of 1.46947.

Input and output fibers 91 and 92 are coupled to the ends of the planar-lightwave-circuit device. The coupling between the optically amplifying waveguide 51 and the optical fiber 91 and between the waveguide 54 and the optical fiber 92 may be performed either through an aspheric lens or by fusion.

Figure 26:
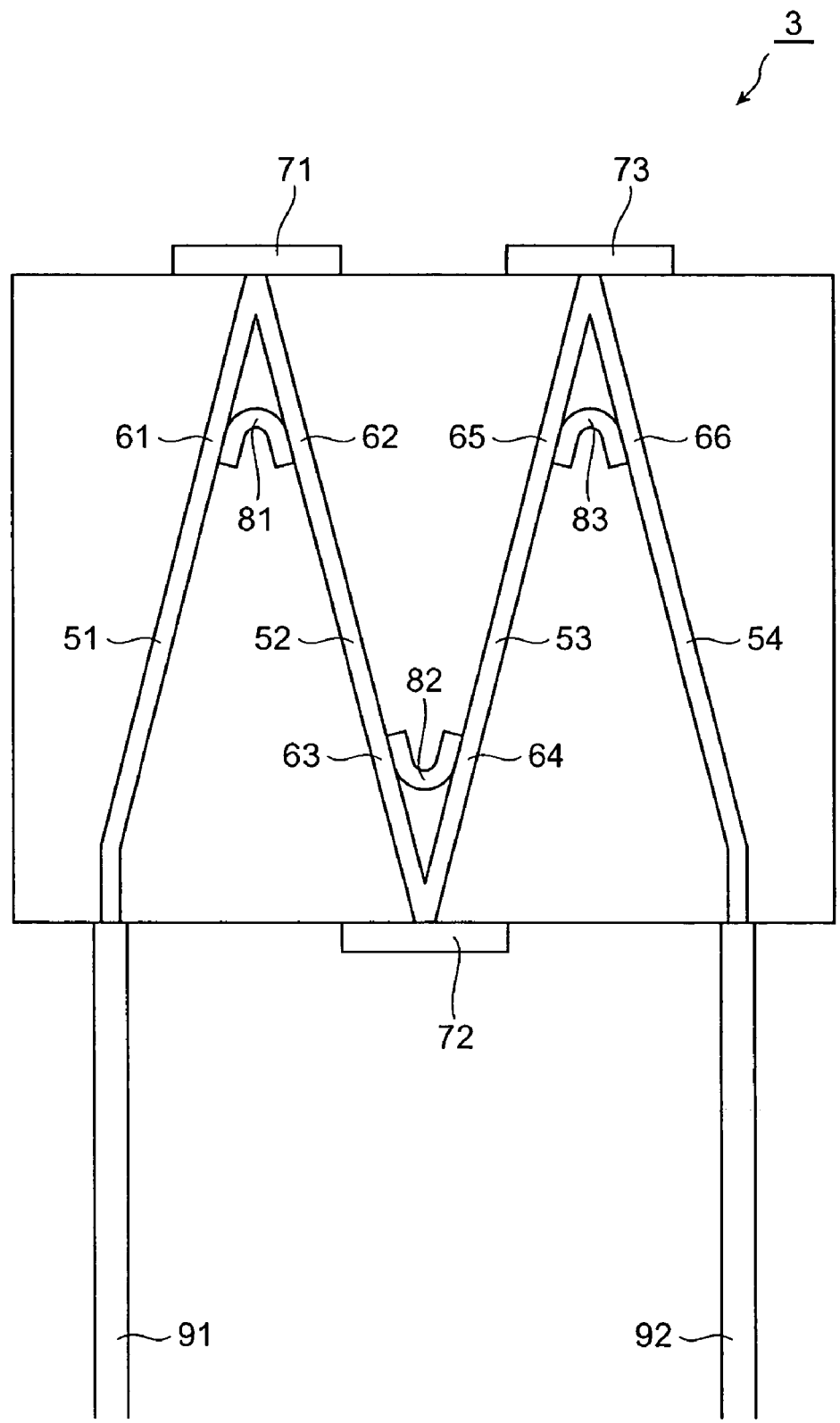
FIG. 26 is a plan view showing another embodiment of the planar-lightwave-circuit device of the present invention.

FIG. 26 is a plan view showing another embodiment of the planar-lightwave-circuit device of the present invention. A planar-lightwave-circuit device 3 is provided with input and output optical fibers 91 and 92 at its same side face. Accordingly, the optical waveguide for transmitting the signal lightwave turns back at side faces of the device. ASE-eliminating filters 71 to 73 for reflecting the signal lightwave and transmitting the ASE lightwave are provided at the turning-back position on the side face. In comparison with the optical amplifier module having the structure shown in FIG. 23, the planar-lightwave-circuit device 3 is advantageous in the space efficiency at the time of the mounting.

In the ASE-eliminating filters 71 to 73, when a specified width of the wavelength range is secured in the reflection spectrum of the signal lightwave and the extinction ratio is increased at the same time, the degree of flexibility in designing the dielectric multilayer film decreases, rendering it difficult to reflect the pumping lightwave at high reflectance. As a result, the pumping lightwave is multiplexed or demultiplexed by WDM couplers 61 to 66 to travel over bypass waveguides 81 to 83.

However, as shown in FIG. 17, it is difficult to increase the extinction ratio for eliminating the ASE in the reflecting path. Consequently, it is desirable, as shown in FIG. 27, either to allow the signal lightwave to transmit an ASE-eliminating filter and to provide a signal lightwave-transmitting waveguide for reversing the traveling direction of the signal lightwave in the shape of the letter "U" or to employ a structure in which the signal lightwave is reflected by a gain-equalizing filter.

Figure 27:
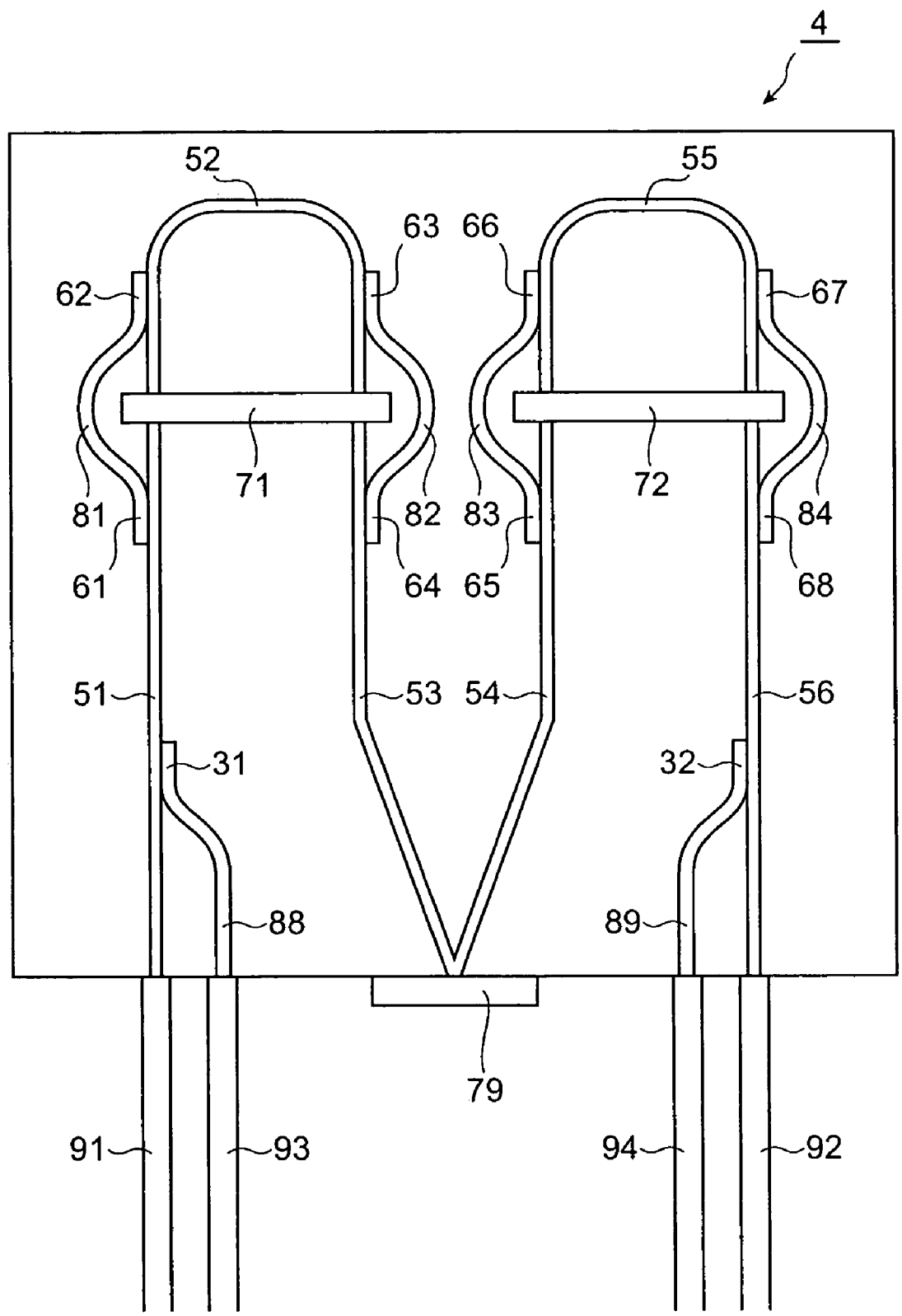
FIG. 27 is a plan view showing yet another embodiment of the planar-lightwave-circuit device of the present invention.

FIG. 27 is a plan view showing yet another embodiment of the planar-lightwave-circuit device of the present invention. A planar-lightwave-circuit device 4 comprises optically amplifying waveguides 51 to 56, bypass waveguides 81 to 84, and pumping lightwave-transmitting waveguides 88 and 89. The planar-lightwave-circuit device 4 also comprises ASE-eliminating filters 71 and 72 inserted in grooves and a gain-equalizing filter 79 placed at a side face of the PLC chip.

In the planar-lightwave-circuit device 4, the pumping lightwave introduced from a pumping lightwave-supplying optical fiber 93 into the pumping lightwave-transmitting waveguide 88 passes through a WDM coupler 31, the optically amplifying waveguide 51, a WDM coupler 61, the bypass waveguide 81, a WDM coupler 62, the optically amplifying waveguide 52, a WDM coupler 63, the bypass waveguides 82, a WDM coupler 64, and the optically amplifying waveguide 53 and reaches the gain-equalizing filter 79 to be reflected. The pumping lightwave introduced from the other pumping lightwave-supplying optical fiber 94 into the pumping lightwave-transmitting waveguide 89 passes through a WDM coupler 32, the optically amplifying waveguide 56, a WDM coupler 68, the bypass waveguide 84, a WDM coupler 67, the optically amplifying waveguide 55, a WDM coupler 66, the bypass waveguides 83, a WDM coupler 65, and the optically amplifying waveguide 54 and reaches the gain-equalizing filter 79 to be reflected.

Similarly, the signal lightwave introduced from a signal lightwave-inputting optical fiber 91 into the optically amplifying waveguide 51 passes through the WDM coupler 31, the optically amplifying waveguide 51, the WDM coupler 61, the ASE-eliminating filter 71, the WDM coupler 62, the optically amplifying waveguide 52, the WDM coupler 63, the ASE-eliminating filter 71, the WDM coupler 64, and the optically amplifying waveguide 53 and is reflected by the gain-equalizing filter 79. Subsequently, the signal lightwave passes through the optically amplifying waveguide 54, the WDM coupler 65, the ASE-eliminating filter 72, the WDM coupler 66, the optically amplifying waveguide 55, the WDM coupler 67, the ASE-eliminating filter 72, the WDM coupler 68, the optically amplifying waveguide 56, and the WDM coupler 32 and is outputted to a signal lightwave-outputting optical fiber 92.

Figure 2:
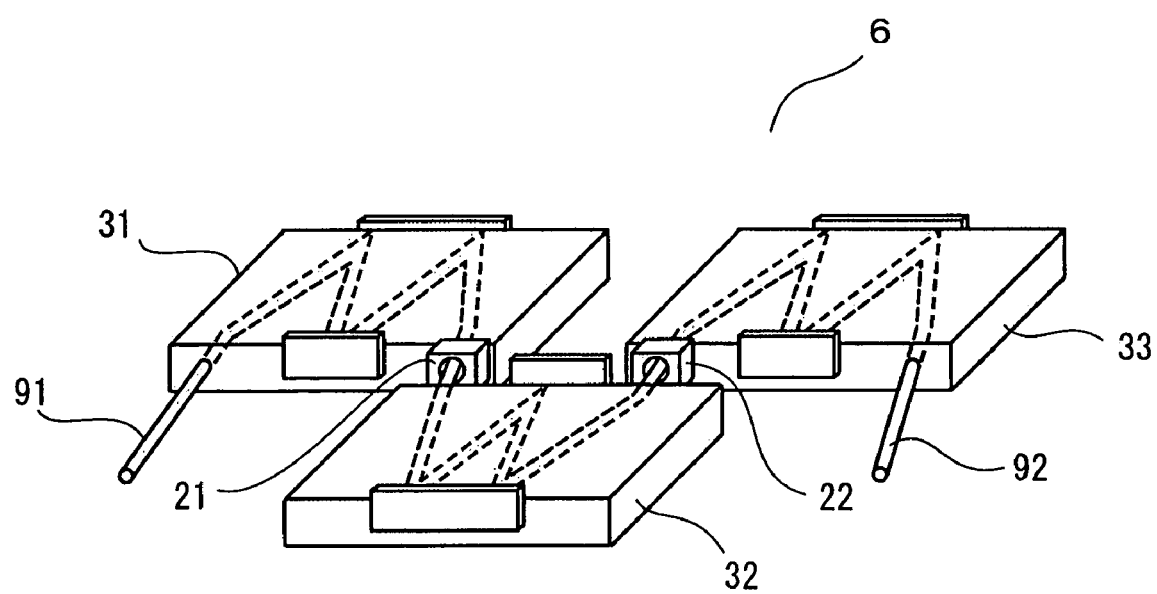
FIG. 2 is a perspective view showing an embodiment of the optical amplifier module comprising a plurality of planar-lightwave-circuit devices of the present invention.
Figure 3:
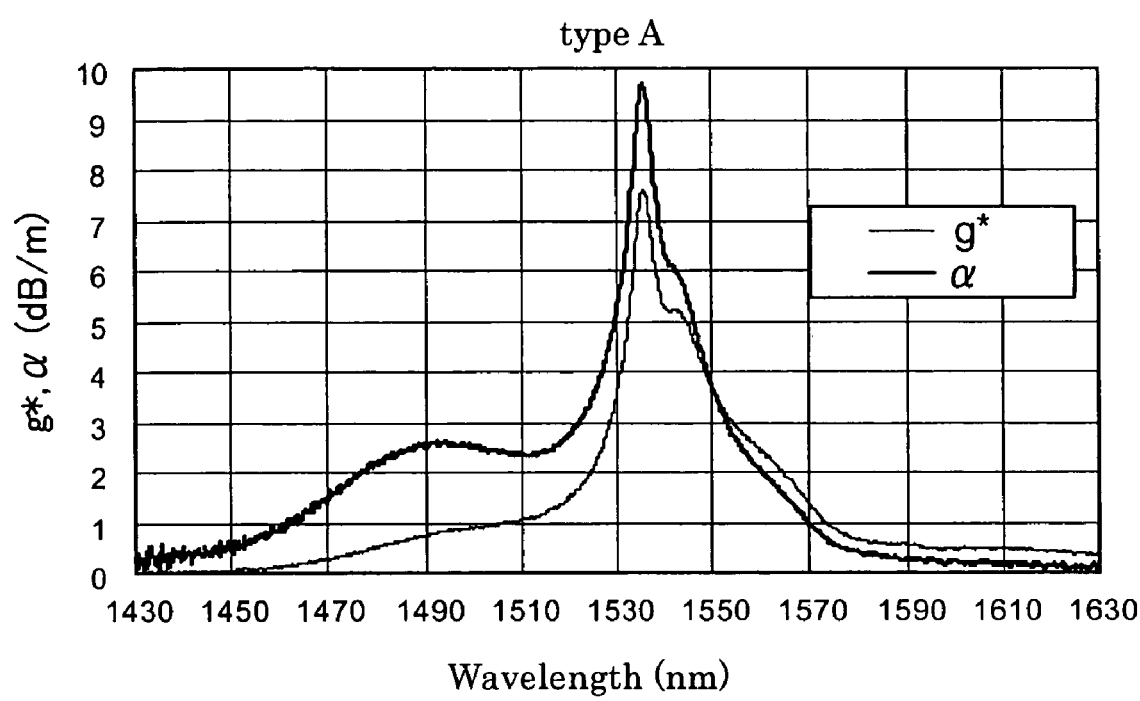
FIG. 3 is a graph showing spectra of the nonsaturation gain and the nonsaturation absorption of Type A EDF.

FIG. 2 is a perspective view showing an embodiment of the optical amplifier module comprising a plurality of planar-lightwave-circuit devices of the present invention. An optical amplifier module 6 comprises three planar-lightwave-circuit devices 31, 32, and 33 and isolators 21 and 22. The planar-lightwave-circuit device 31 is connected to the planar-lightwave-circuit device 32 through the isolator 21. The planar-lightwave-circuit device 32 is connected to the planar-lightwave-circuit device 33 through the isolator 22. The optical amplifier module 6 can increase the gain by increasing the number of planar-lightwave-circuit devices.

Figure 28:
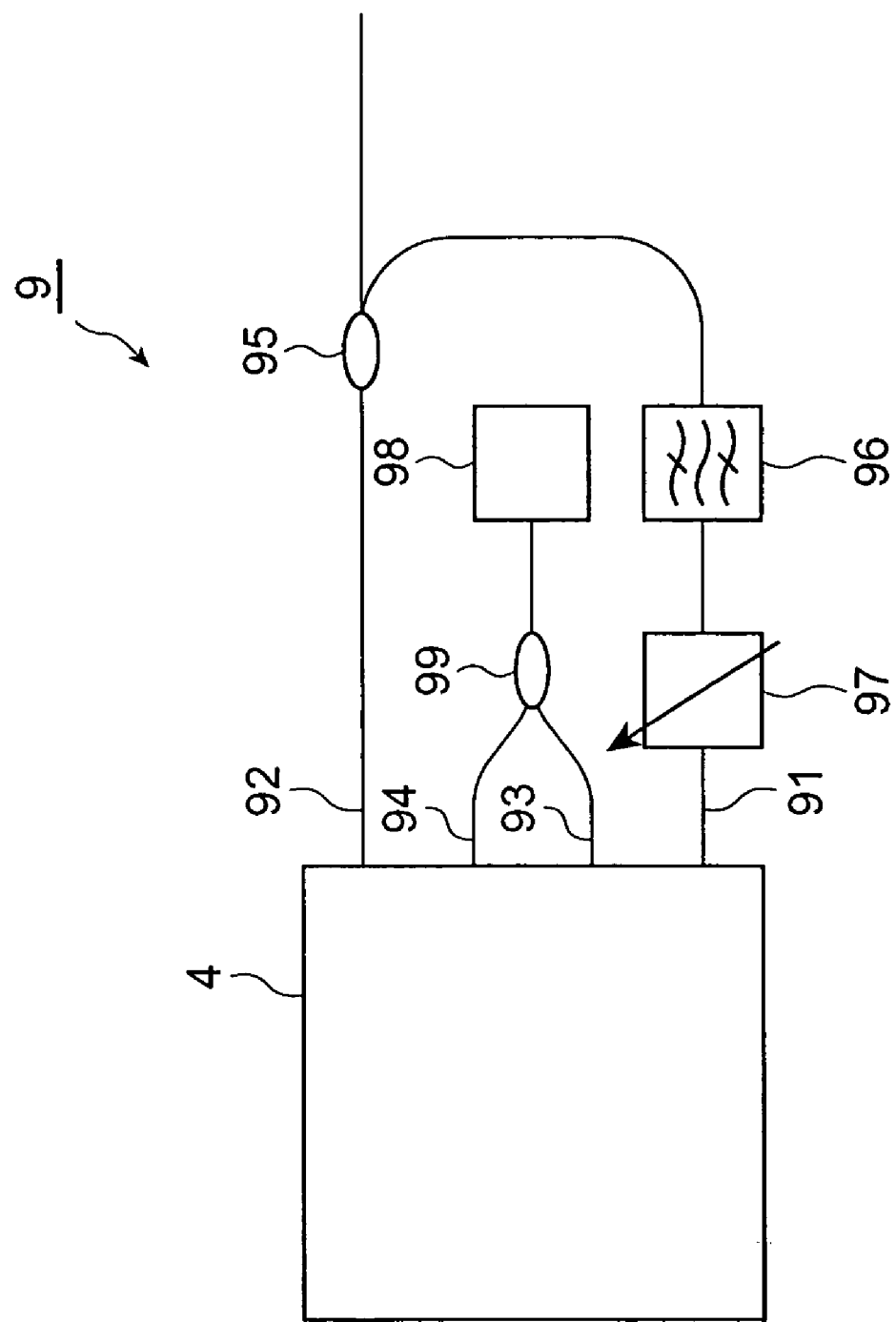
FIG. 28 is a schematic diagram showing an embodiment of the laser module of the present invention.

The planar-lightwave-circuit device of the present invention can not only be used as an optical amplifier but also form a laser module by using a configuration as shown in FIG. 28. FIG. 28 is a schematic diagram showing an embodiment of the laser module of the present invention. A laser module 9 comprises not only a planar-lightwave-circuit device 4 but also a fiber-optic coupler 95, a band-pass filter 96, a variable optical attenuator 97, a pump source 98, and a fiber-optic coupler 99. The pumping lightwave outputted from the pump source 98 is bifurcated by the fiber-optic coupler 99 to be supplied to the planar-lightwave-circuit device 4 through optical fibers 93 and 94. A signal lightwave-outputting optical fiber 92 is provided with the fiber-optic coupler 95. The band-pass filter 96 and the variable optical attenuator 97 are provided between a signal lightwave-outputting optical fiber 91 and the fiber-optic coupler 95. The laser module 9 has the structure of a ring-type laser resonator. The signal lightwave outputted from the planar-lightwave-circuit device 4 to the optical fiber 92 is branched by the fiber-optic coupler 95. The branched signal lightwave passes through the band-pass filter 96, the variable optical attenuator 97, and the optical fiber 91 and returns to the planar-lightwave-circuit device 4. This laser module has a wide variable range in oscillation wavelength.

According to the gain property shown in FIG. 19, in the Al-doped EDF having no doped phosphorus, even when the absorption-length product is decreased, the net gain becomes zero at a wavelength of 1,480 nm, so that it is physically impossible to achieve the laser oscillation. In contrast, according to the gain property shown in FIG. 20, in the optically amplifying waveguide of an embodiment of the present invention, even when the wavelength is 1,480 nm, a gain of 2 dB is achieved at room temperature and a gain of 4 dB is achieved at a temperature of 75° C.

As described above, when the net gain becomes larger than the loss of the laser resonator, the laser oscillation can be achieved. In the configuration shown in FIG. 28, the loss of the laser resonator is practically determined by the branching ratio of the fiber-optic coupler 95. As the branching ratio of the fiber-optic coupler 95 becomes higher, it becomes easier to achieve a high laser output, but it becomes more difficult to achieve the laser oscillation. In the case of the gain at a temperature of 75° C. shown in FIG. 20, the oscillation can be achieved at a wavelength of 1,480 nm even when a 3-dB coupler is used as the fiber-optic coupler 95.

Generally, in an EDFA, when the population inversion varies, the magnitude and shape of the gain spectrum vary. As described in a literature reported by M. Kakui et al ("the English Journal of the Institute of Electronics, Information and Communication Engineers of Japan," Vol. E83-C, No. 6, p. 799), in the C-band and L-band, the variation in the shape of the gain spectrum is a simple decrease or increase. In other words, the variation in the shape of the gain spectrum becomes the variation in the tilt of the gain spectrum. Hence, this phenomenon is called the dynamic gain tilt (DGT). The shape of the DGT is given by the sum of the nonsaturation gain and the nonsaturation absorption shown in FIG. 9.

As can be seen from the nonsaturation gain, g*, and the nonsaturation absorption, α, shown in FIG. 9, in Type C P—Al-codoped EDFA (or erbium-doped waveguide amplifier), the sum "g*+α" assumes at least one minimum value without showing a simple increase or decrease in a wavelength range of 1,488 to 1,518 nm. As a result, the sum "g*+α" has a small variation in the wavelength range. This means that even when the population inversion varies, the shape of the gain spectrum does not vary much. This feature is advantageous in controlling the magnitude of the gain particularly in the optical amplifier for the WDM signal lightwave. In the optical amplifier module of the present invention, the variation in the shape of the gain spectrum caused by the variation in the population inversion does not become the variation in the tilt. Accordingly, the expression "DGT" is revised to be called the dynamic gain variation (DGV).

The DGV normalized by using the intrarange average gain $G_M$ [dB] is expressed as $V(\lambda)$. The value of $V(\lambda)$ is given by the following equation:

$$V(\lambda) = (G(\lambda) - G_M)/G_M \quad (1)$$

where $G(\lambda)$ [dB] is the gain at a wavelength of $\lambda$.

Figure 29A:
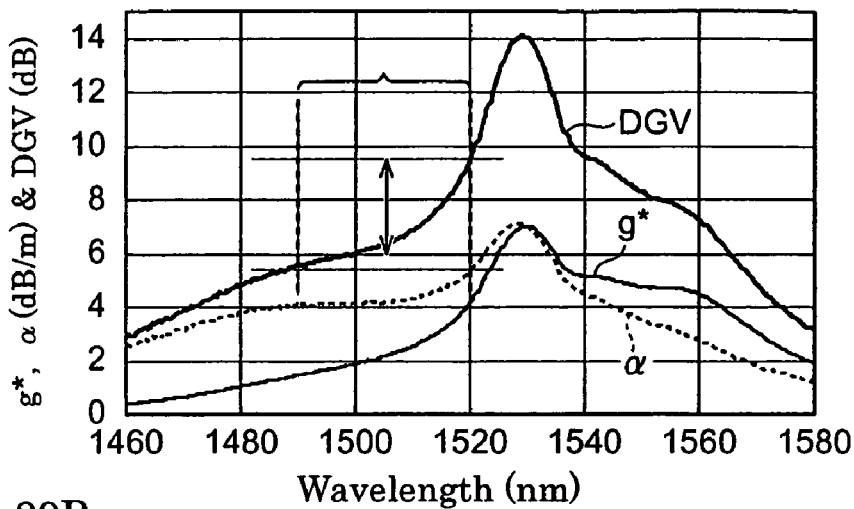
FIG. 29A is a graph showing spectra of the nonsaturation gain, the nonsaturation absorption, and the dynamic gain variation (DGV) of an Al-doped EDF having no doped phosphorus.
Figure 29B:
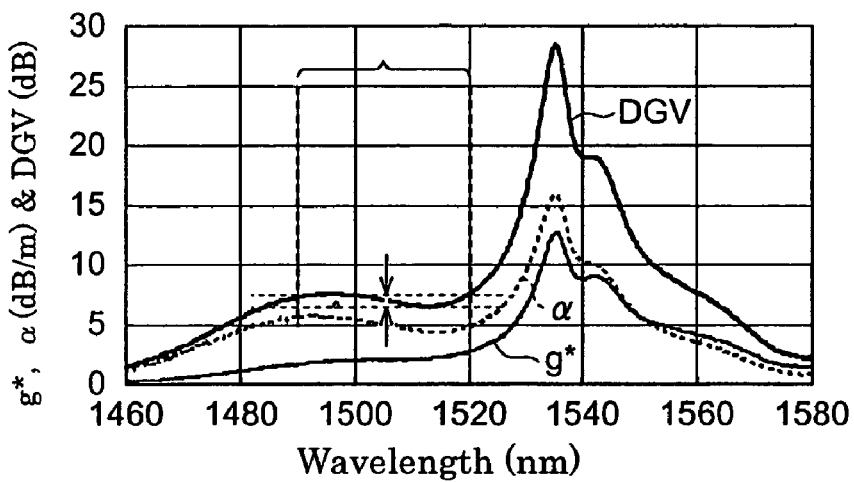
FIG. 29B is a graph showing spectra of the nonsaturation gain, the nonsaturation absorption, and the DGV of Type C EDF.
Figure 29C:
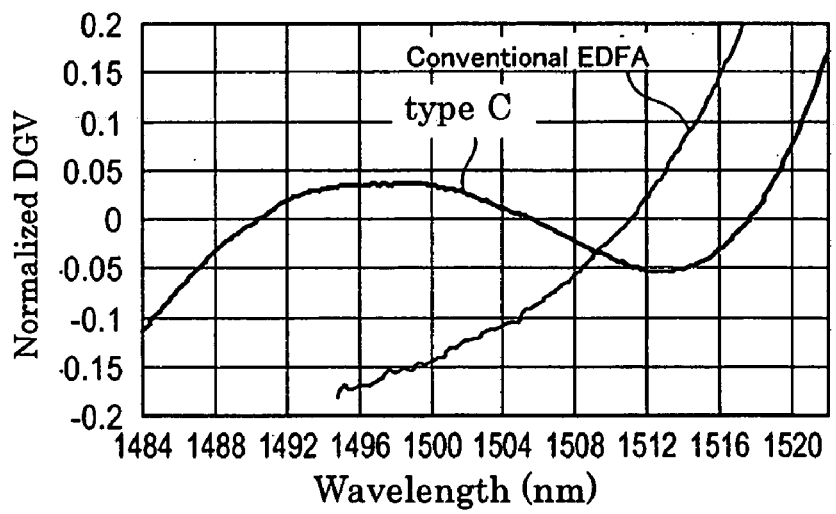
FIG. 29C is a graph showing the normalized DGVs of the two EDFs.

FIG. 29A is a graph showing spectra of the nonsaturation gain, g*, the nonsaturation absorption, α, and the DGV of an Al-doped EDF having no doped phosphorus. FIG. 29B is a graph showing spectra of the nonsaturation gain, g*, the nonsaturation absorption, α, and the DGV of Type C EDF. FIG. 29C is a graph showing the normalized DGVs of the two EDFs when a wavelength range of 1,495 to 1,520 nm is used as the band for the signal lightwave. In Type C EDF, the variation range of the normalized DGV in the wavelength range of 1,495 to 1,520 nm is 0.13 and is within a range of ±0.1. A comparable DGV property can be achieved even when the wavelength range of the signal is extended to a range of 1,488 to 1,520 nm. Furthermore, when a prime importance is placed on the DGV and a signal's wavelength range of 1,488 to 1,518 nm is targeted, the variation range is 0.09 and is within a range of ±0.05. On the other hand, in the conventional EDF, the variation of the normalized DGV in the wavelength range of 1,495 to 1,520 nm lies in a range of −0.18 to +0.36. In other words, the variation range is 0.54, which is more than three times the foregoing corresponding value. It is desirable that the normalized DGV be within ±0.25, more desirably within ±0.10, yet more desirably within ±0.05.

Such a flat DGV property can be achieved by not only Type C EDF but also Types A, B, D, and E. In addition, the composition is not limited to the composition having doped phosphorus. For example, the codoping of boron or the like enables at least one of the stimulated-emission cross section and the absorption cross section to assume a maximum value at the shorter-wavelength side of the peak at a wavelength range of 1.53 μm. This feature is desirable to flatten the DGV property.

Figure 30:
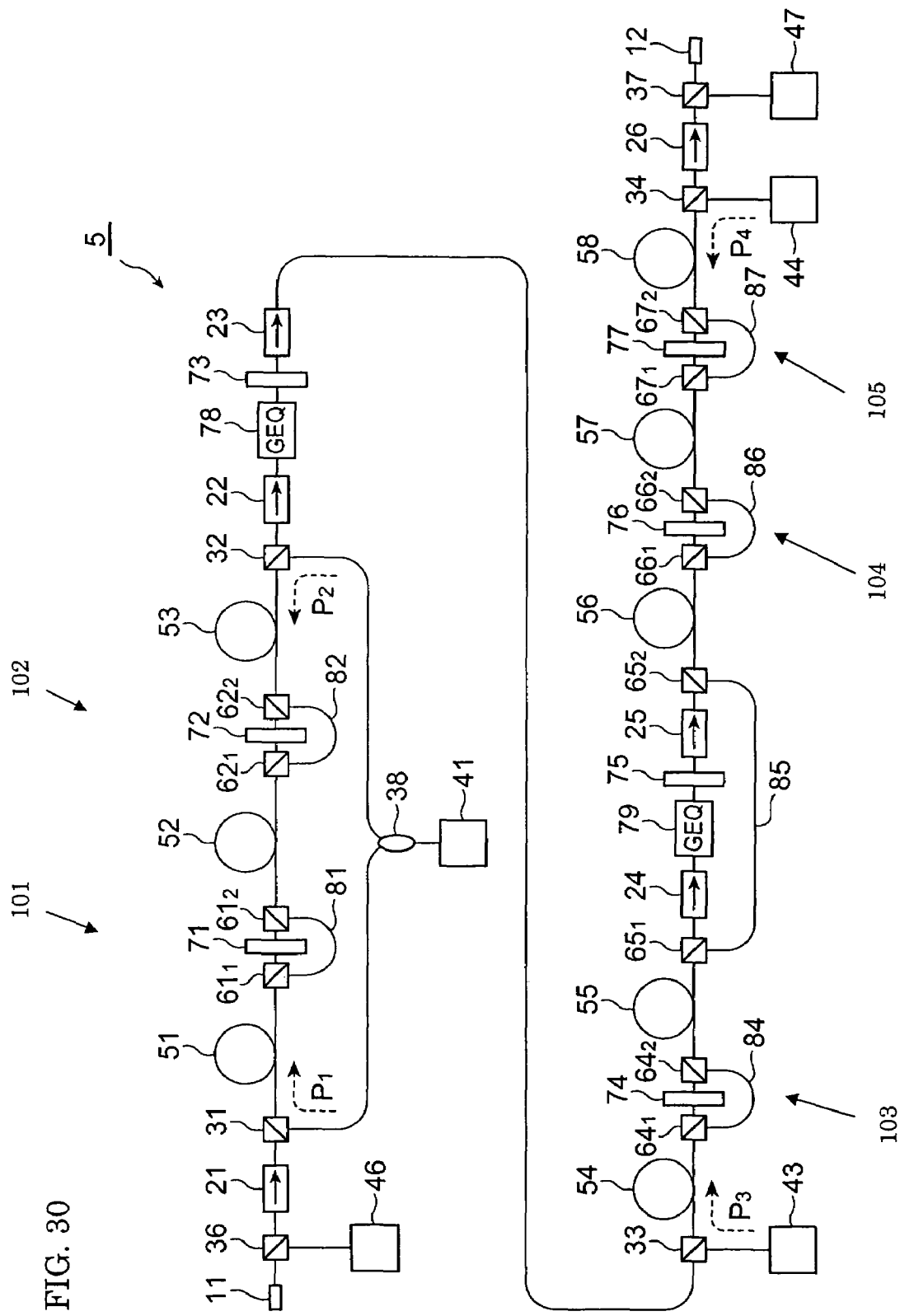
FIG. 30 is a schematic diagram of an optical amplifier module 5, which is yet another embodiment of the optical amplifier module of the present invention.

An eight-stage gain-flattened S-band-use optical amplifier as shown in FIG. 30 was produced, and it was evaluated at room temperature by using a WDM signal at a wavelength range of 1,495 to 1,520 nm. FIG. 30 is a schematic diagram of an optical amplifier module 5, which is yet another embodiment of the optical amplifier module of the present invention. The optical amplifier module 5 comprises eight optically amplifying waveguides 51 to 58 connected in series in that order from an input connector 11 to an output connector 12.

A fiber-optic coupler 36, an optical isolator 21, and a WDM optical coupler 31 are placed between the input connector 11 and the optically amplifying waveguide 51. A photodetector 46 for monitoring the input signal lightwave is connected to the fiber-optic coupler 36. A 3-dB coupler 38 is connected to the WDM optical coupler 31. A linking portion 101 comprising WDM couplers $61_1$ and $61_2$, an ASE-eliminating filter 71, and a bypass waveguide 81 is placed between the optically amplifying waveguides 51 and 52. The bypass waveguide 81 is placed between the WDM couplers $61_1$ and $61_2$. A linking portion 102 having the same structure as that of the linking portion 101 is placed between the optically amplifying waveguides 52 and 53.

A WDM coupler 32, an optical isolator 22, a gain equalizer 78, an ASE-eliminating filter 73, an optical isolator 23, and a WDM coupler 33 are placed between the optically amplifying waveguides 53 and 54. The 3-dB coupler 38 is also connected to the WDM coupler 32. A pump source 43 is connected to the WDM coupler 33. A linking portion 103 having the same structure as that of the linking portion 101 is placed between the optically amplifying waveguides 54 and 55.

A WDM coupler $65_1$, an optical isolator 24, a gain equalizer 79, an ASE-eliminating filter 75, an optical isolator 25, and a WDM coupler $65_2$ are placed between the optically amplifying waveguides 55 and 56. A bypass waveguide 85 is placed between the WDM couplers $65_1$ and $65_2$. A linking portion 104 having the same structure as that of the linking portion 101 is placed between the optically amplifying waveguides 56 and 57. A linking portion 105 having the same structure as that of the linking portion 101 is placed between the optically amplifying waveguides 57 and 58.

A WDM coupler 34, an optical isolator 26, and a fiber-optic coupler 37 are placed between the optically amplifying waveguide 58 and the output connector 12. A pump source 44 is connected to the WDM coupler 34. A photodetector 47 for monitoring the output signal lightwave is connected to the fiber-optic coupler 37.

The pumping lightwave in a wavelength range of 0.98 μm outputted from the pump source 41 is bifurcated by the 3-dB optical coupler 38 to be supplied to the optically amplifying waveguides 51 to 53 from both directions through the WDM optical couplers 31 and 32. The pumping lightwave in a wavelength range of 0.98 μm outputted from the pump source 43 is supplied to the optically amplifying waveguides 54 to 58 in the forward direction through the WDM optical coupler 33. The pumping lightwave in a wavelength range of 0.98 μm outputted from the pump source 44 is supplied to the optically amplifying waveguides 54 to 58 in the reverse direction through the WDM optical coupler 34.

Figure 31:
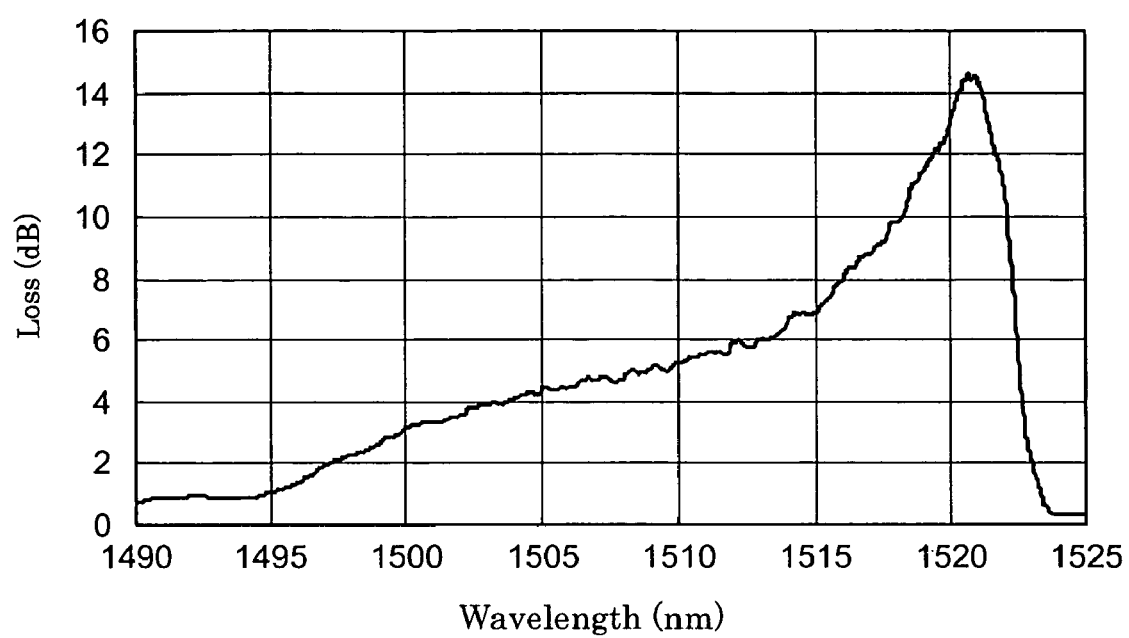
FIG. 31 is a graph showing the loss spectrum of the gain equalizer included in the optical amplifier module 5.

The WDM couplers $61_1$ to $61_1$ and $61_2$ to $66_2$ are provided to transmit the pumping lightwave through the bypass waveguides 81 to 87 without transmitting it through the ASE-eliminating filters 71 to 77. FIG. 31 is a graph showing the loss spectrum of the gain equalizers 78 and 79 included in the optical amplifier module 5.

Figure 32:
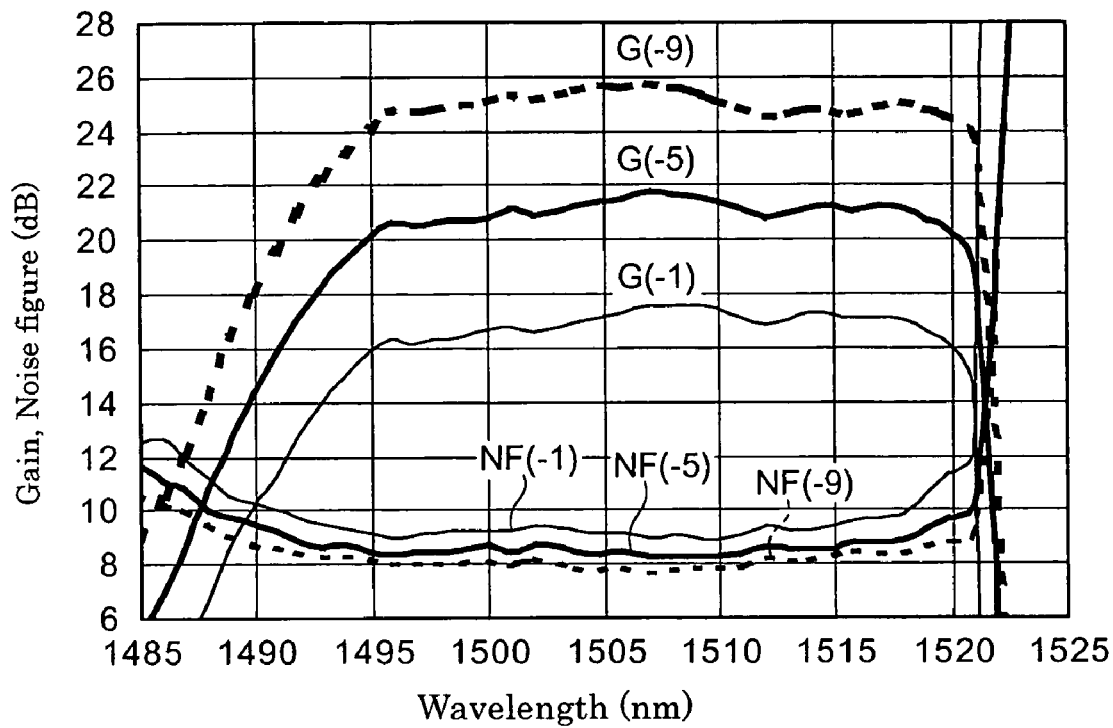
FIG. 32A is a graph showing spectra of the gain and the noise figure of the optical amplifier module 5 using the power of the input signal as a parameter.
FIG. 32B is a graph showing the output level of the signal lightwave in the optical amplifier module 5 with reference to the power of the output signal when the power of the input signal is −5 dBm.
Figure 32:
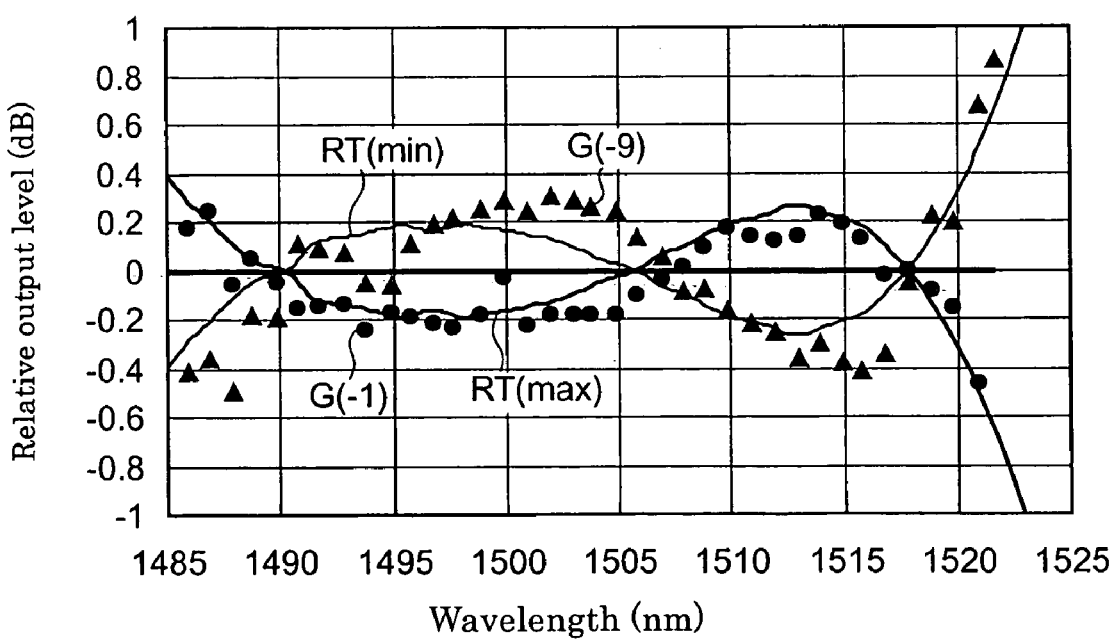

FIG. 32A is a graph showing spectra of the gain and the noise figure of the optical amplifier module 5 when the power of the signal lightwave inputted into the input connector 11 is −1 dBm, −5 dBm, or −9 dBm. FIG. 32B is a graph showing the output level of the signal lightwave in the optical amplifier module 5 when the power of the input signal is −1 dBm or −9 dBm with reference to the power of the output signal when the power of the input signal is −5 dBm.

As shown in FIG. 32A, with any one of the levels of the input signal lightwave, the gain spectrum has practically no variation in shape. The gain variation is maintained within 1.7 dB in a wavelength range of 1,495 to 1,520 nm. In FIG. 32B, the black circular dot and the black triangular dot represent the measurement results, and the curves are obtained by multiplying the normalized DGV shown in FIG. 29C by an average gain variation of ±4 dB. Because the optical amplifier module 5 has a large structure of being an eight-stage configuration, the polarization-dependent loss and the like of the passive optical parts are accumulated. Therefore, this experiment cannot be expected to have an accuracy of within ±0.1 dB. Nevertheless, the values of the variation of the two data are in close agreement with each other.

Table II summarizes powers $P_1$, $P_2$, $P_3$, and $P_4$ of the pumping lightwaves supplied from the pump sources 41, 42, 43, and 44 and the power conversion efficiency (PCE) in the optical amplifier module 5. The PCE is obtained by calculating the ratio of the output of the signal lightwave from the EDFs to the sum of the pumping powers.

TABLE II

| Signal input power dBm | $P_1$ mW | $P_2$ mW | $P_3$ mW | $P_4$ mW | Total power mW | PCE % |
|---|---|---|---|---|---|---|
| −9 | 60.0 | 54.2 | 115.6 | 487.0 | 716.8 | 6.0 |
| −5 | 60.0 | 54.2 | 115.6 | 248.0 | 477.8 | 8.9 |
| −1 | 60.0 | 54.2 | 115.6 | 204.0 | 433.8 | 9.8 |

An example of the optical amplifier module incorporating an Al-doped EDF of a prior art is reported in a literature written by H. Ono, M. Yamada, and M Shimizu ("Electron. Lett.," Vol. 38, No. 19, p. 1084, September 2002). According to this literature, when the input power of the signal is −5 dBm, a PCE of 5.7% is achieved. In contrast, in the optical amplifier module 5, the number of gain equalizers is reduced and, as a result, when the input power of the signal lightwave is −5 dBm, the PCE increases to 1.56 times. In other words, the pumping power needed can be reduced to about two-thirds.

This embodiment used a gain equalizer based on the fiber Bragg grating. Consequently, the reflectance of the gain equalizer was large, and it was necessary to insert an isolator before and after the gain equalizer. As a result, the excess loss -increased-. However, when -the gain equalizer is formed by using a dielectric multilayer film or the like, the PCE can be further improved. Alternatively, when the excess loss is utilized as a gain-equalizing profile, the wavelength range of the signal lightwave can be extended to the shorter-wavelength side than 1,495 nm.

The above is the description of the result of the experiment conducted at room temperature. As can be seen from FIG. 20, at a constant pumping power, the S-band gain of the P—Al-codoped EDF increases as the temperature increases. In other words, when the signal-lightwave input power and the signal-lightwave output power are unchanged, the PCE can be further improved.

Figure 33A:
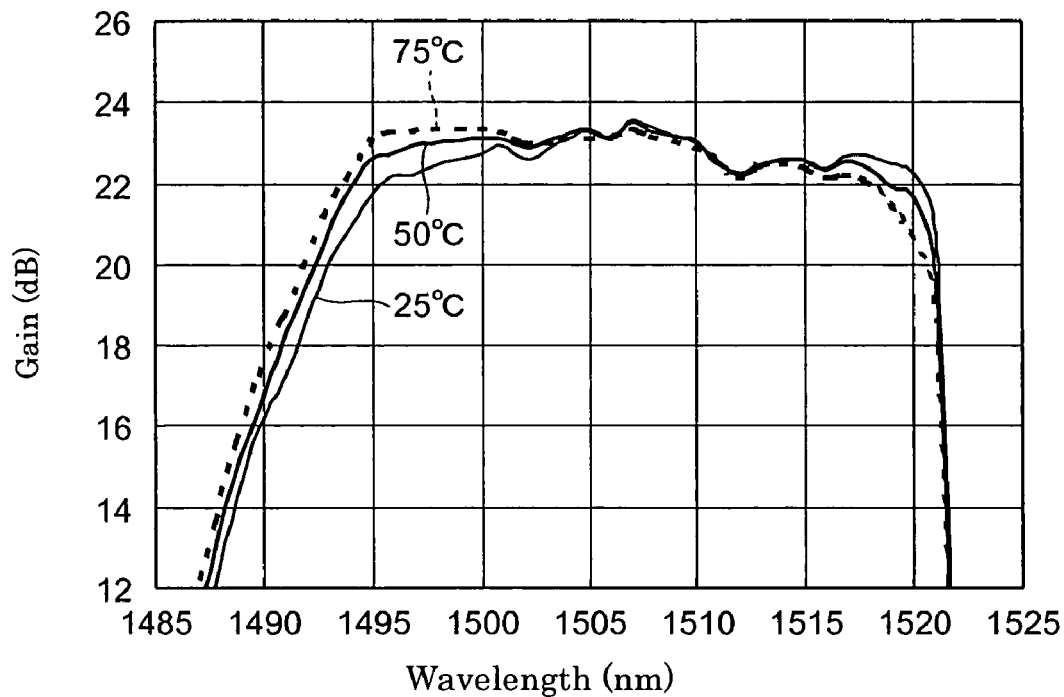
FIG. 33A is a graph showing gain spectra of the optical amplifier module 5 using as a parameter the temperature of the environment in which the optical amplifier module 5 is placed.
Figure 33B:
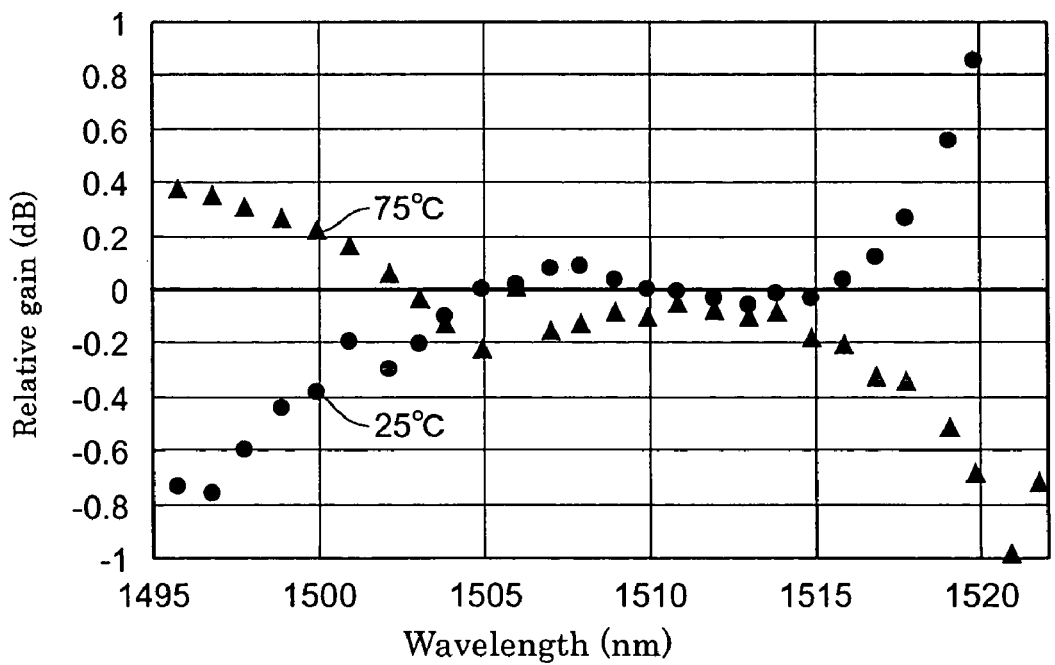
FIG. 33B is a graph showing gain spectra of the optical amplifier module 5 with reference to its gain spectrum when it is placed in an environment at 50° C.

FIG. 33A is a graph showing gain spectra of the optical amplifier module 5 using as a parameter the temperature of the environment in which the optical amplifier module 5 is placed. FIG. 33B is a graph showing gain spectra of the optical amplifier module 5 with reference to its gain spectrum when it is placed in an environment at 50° C. Table III summarizes the powers of the pumping lightwaves and the power conversion efficiencies (PCEs) in the optical amplifier module 5 using the temperature as a parameter.

TABLE III

| Temperature ° C. | $P_1$ mW | $P_2$ mW | $P_3$ mW | $P_4$ mW | Total power mW | PCE % |
|---|---|---|---|---|---|---|
| 25 | 60.0 | 54.2 | 115.6 | 427.0 | 656.8 | 10.2 |
| 50 | 60.0 | 54.2 | 115.6 | 304.0 | 533.8 | 12.1 |
| 75 | 60.0 | 54.2 | 115.6 | 262.0 | 491.8 | 13.3 |

In this case, the signal-lightwave input power-was predetermined at −5 dBm, and the signal-lightwave output power, at +17.1 dBm. Table III shows that the PCE is improved by about 30 percent by increasing the temperature from 25° C. to 75° C. In this case, as the temperature increases, the gain spectrum gradually increases the tendency to sag at the right-hand side.

As explained by referring to FIGS. 32A and 32B, in the optical amplifier module of this embodiment, even when the population inversion varies, practically no gain tilt is produced. This feature is advantageous when the WDM signal is amplified in a broad dynamic range. However, in the WDM transmission system, the signal spectrum sometimes tilts due to the stimulated Raman scattering (SRS) phenomenon in the optical fiber forming the transmission line. In such a case, in an Al-doped EDF having no doped phosphorus, the combination with a variable attenuator enables the compensation of the SRS tilt with the DGT. However, this compensation cannot be performed in the optical amplifier module 5.

Consequently, it is desirable to contain a device such as an optical attenuator that can vary the loss-spectrum tilt (see a literature reported by H. Hatayama, C. Hirose, K Koyama, N. Akasaka, and N. Nishimura, "Variable attenuation slope compensator (VASC) using silica-based planar lightwave circuit technology for active gain slope control in EDFAs," OFC 2000, Tech. Dig., WH7, 2000). In this case, however, the excess loss and the cost will also increase. Consequently, it is also desirable to employ in terms of the cost and PCE a system that utilizes a gain tilt produced by the temperature control as shown in FIG. 33B.

It is desirable to use the above-explained optical amplifier module in an optical communication system to optically amplify a signal lightwave having a multitude of wavelengths lying in a wavelength range of 1,490 to 1,530 nm to transmit it.

This specification incorporates the entire disclosure of japanese patent application 2003-314622 filed on Sep. 5, 2003 and japanese patent application 2004-50344 filed on Feb. 25, 2004 including the specification, claims, drawing, and summary:

What is claimed is:

1. An optically amplifying waveguide containing silica glass as a major constituent and comprising a lightwave-guiding region containing the element erbium in at least one part of the region;
   the optically amplifying waveguide having a stimulated-emission cross section and an absorption cross section such that at least one of the two cross sections assumes a maximum value at the shorter-wavelength side of a peak at a wavelength range of 1.53 μm.

2. An optically amplifying waveguide as defined by claim 1, wherein at least one part of the lightwave-guiding region contains the element phosphorus.

3. An optically amplifying waveguide as defined by claim 2, the optically amplifying waveguide having a nonsaturation gain per unit length and a non-saturation absorption per unit length such that the ratio of the peak value of the former to that of the latter is at least 0.8.

4. An optically amplifying waveguide as defined by claim 2, wherein at least one part of the lightwave-guiding region contains an oxide of an element that can turn into a trivalent positive ion.

5. An optically amplifying waveguide as defined by claim 4, wherein the oxide is aluminum oxide.

6. An optically amplifying waveguide as defined by claim 5, wherein the element aluminum included in the aluminum oxide has an average concentration of at most 0.75 wt. % in the lightwave-guiding region.

7. An optically amplifying waveguide as defined by claim 5, wherein the ratio of the concentration of the element aluminum to that of the element phosphorus is at most 0.17.

8. An optically amplifying waveguide as defined by claim 4, wherein the oxide is ytterbium oxide.

9. An optically amplifying waveguide containing phosphate glass as a major constituent and comprising a lightwave-guiding region containing the element erbium in at least one part of the region;
the optically amplifying waveguide having a stimulated-emission cross section and an absorption cross section such that at least one of the two cross sections assumes a maximum value at the shorter-wavelength side of a peak at a wavelength range of 1.53 µm.

10. An optically amplifying waveguide as defined by claim 1 or 9, the optically 15 amplifying waveguide being an optical fiber.

11. An optically amplifying waveguide as defined by claim 1 or 9, the optically amplifying waveguide being a planar lightwave circuit.

12. An optically amplifying waveguide as defined by claim 1 or 9, wherein the spectrum of the amount of variation in gain due to the variation in population inversion assumes at least one minimum value in a specified wavelength range.

13. An optically amplifying waveguide containing one of silica glass and phosphate glass as a major constituent and comprising a lightwave-guiding region containing the element erbium in at least one part of the region;
the optically amplifying waveguide having a feature in that the amount of variation in gain spectrum due to the population inversion is within a range of ±0.25 in a wavelength-range width of at least 25 nm included in a wavelength range of 1,470 to 1,530 nm when the amount of variation is normalized by using the average gain in the wavelength-range width.

14. An optically amplifying waveguide as defined by claim 13, wherein the amount of variation is within a range of ±0.1 when normalized by using the average gain.

15. An optical amplifier module comprising:
(a) an input terminal for a signal lightwave;
(b) an output terminal for a signal lightwave; and
(c) an optically amplifying waveguide containing one of silica glass and phosphate glass as a major constituent and comprising a lightwave-guiding region containing the element erbium in at least one part of the region, the optically amplifying waveguide having a stimulated-emission cross section and an absorption cross section such that at least one of the two cross sections assumes a maximum value at the shorter-wavelength side of a peak at a wavelength range of 1.53 µm;
the optical amplifier module optically amplifying a signal lightwave that has a wavelength lying in a wavelength range of 1,490 to 1,530 nm and that has entered the input terminal to output the optically amplified signal lightwave from the output terminal,
wherein the pumping lightwave to be supplied to the optically amplifying waveguide has a wavelength lying in a wavelength range of 979 to 981 nm.

16. An optical amplifier module as defined by claim 15, the optical amplifier module further comprising an ASE-eliminating filter that is inserted at some midpoint in the optically amplifying waveguide and that has an extinction ratio of at least 46 dB at an ASE peak wavelength in a wavelength range of 1.53 µm.

17. An optical amplifier module as defined by claim 15, wherein the amount of variation in gain spectrum due to population inversion is within a range of ±0.25 in a wavelength range of a signal lightwave when the amount of variation is normalized by using the average gain in the wavelength range.

18. An optical amplifier module as defined by claim 17, wherein the amount of variation is within a range of ±0.1 when normalized by using the average gain.

19. An optical amplifier module as defined by claim 17, wherein at least one part of the wavelength range of the signal lightwave overlaps a wavelength range of 1,488 to 1,518 nm.

20. A planar-lightwave-circuit device comprising:
(a) a substrate;
(b) a planar lightwave circuit containing one of silica glass and phosphate glass as a major constituent and comprising a lightwave-guiding region containing the element erbium in at least one part of the region, the planar lightwave circuit having a stimulated-emission cross section and an absorption cross section such that at least one of the two cross sections assumes a maximum value at the shorter-wavelength side of a peak at a wavelength range of 1.53 µm, the planar lightwave circuit being placed on the substrate;
(c) at least one ASE-eliminating filter; and
(d) a path through which a pumping lightwave bypasses at least one of the at least one ASE-eliminating filter.

21. A planar-lightwave-circuit device as defined by claim 20, the planar-lightwave-circuit device further comprising:
(a) a turning-back waveguide that turns back at a turning-back position on a side face of the substrate; wherein
in the planar-lightwave-circuit device, the planar lightwave circuit and the turning-back waveguide being connected with each other to transmit a signal lightwave, and said at least one ASE eliminating filter being placed at the turning back position.

22. A planar-lightwave-circuit device as defined by claim 20, wherein, in the planar-lightwave-circuit device, said at least one ASE-eliminating filter being placed on the substrate.

23. A planar-lightwave-circuit device as defined by claim 20, the planar-lightwave-circuit device being provided with an input fiber for inputting a signal lightwave and an output fiber for outputting a signal lightwave;
in the planar-lightwave-circuit device, both of the input fiber and the output fiber being placed at the same side face of the substrate.

24. An optical amplifier module comprising:
(a) an input terminal for a signal lightwave;
(b) an output terminal for a signal lightwave; and (c) an optically amplifying waveguide containing one of silica glass and phosphate glass as a major constituent and comprising a lightwave-guiding region containing the element erbium in at least one part of the region, the optically amplifying waveguide having a feature in that the amount of variation in gain spectrum due to the population inversion is within a range 10 of ±0.25 in a wavelength-range width of at least 25 nm included in a wavelength range of 1,470 to 1,530 nm when the amount of variation is normalized by using the average gain in the wavelength-range width;

in the optical amplifier module, at least one part of the wavelength range of the signal lightwave overlapping a wavelength range of 1,488 to 1,518 nm.

25. An optical amplifier module comprising a plurality of planar-lightwave-circuit devices each of which comprises:

(a) a substrate; and
(b) a planar lightwave circuit containing one of silica glass and phosphate glass as a major constituent and comprising a lightwave-guiding region containing the element erbium in at least one part of the region, the planar lightwave circuit having a stimulated-emission cross section and an absorption cross section such that at least one of the two cross sections assumes a maximum value at the shorter-wavelength side of a peak at a wavelength range of 1.53 μm, the planar lightwave circuit being placed on the substrate;

at least two of the planar-lightwave-circuit devices being incorporated into the optical amplifier module without the intervention of optical fiber.

* * * * *